(12) United States Patent
Zhou et al.

(10) Patent No.: US 11,664,937 B2
(45) Date of Patent: May 30, 2023

(54) TECHNIQUES FOR CROSS-CARRIER REPETITION

(71) Applicant: QUALCOMM Incorporated, San Diego, CA (US)

(72) Inventors: Yan Zhou, San Diego, CA (US); Tao Luo, San Diego, CA (US); Xiaoxia Zhang, San Diego, CA (US); Mostafa Khoshnevisan, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 16/904,394

(22) Filed: Jun. 17, 2020

(65) Prior Publication Data

US 2020/0412488 A1 Dec. 31, 2020

Related U.S. Application Data

(60) Provisional application No. 62/867,655, filed on Jun. 27, 2019.

(51) Int. Cl.
*H04L 1/1867* (2023.01)
*H04B 7/0456* (2017.01)
*H04B 7/0417* (2017.01)
*H04W 24/08* (2009.01)
*H04W 72/21* (2023.01)

(52) U.S. Cl.
CPC ........... *H04L 1/189* (2013.01); *H04B 7/0417* (2013.01); *H04B 7/0456* (2013.01); *H04W 24/08* (2013.01); *H04W 72/21* (2023.01)

(58) Field of Classification Search
CPC ..... H04L 1/189; H04L 5/0055; H04L 5/0053; H04L 1/1893; H04L 1/1896; H04B 7/0417; H04B 7/0456; H04W 24/08; H04W 72/0413; H04W 48/12
See application file for complete search history.

(56) References Cited

U.S. PATENT DOCUMENTS

| | | | |
|---|---|---|---|
| 2009/0055703 A1* | 2/2009 | Kim | ..................... H04L 1/1861 714/748 |
| 2018/0070341 A1* | 3/2018 | Islam | ..................... H04L 1/1812 |
| 2018/0139727 A1* | 5/2018 | Bayesteh | .................. H04L 1/08 |

(Continued)

FOREIGN PATENT DOCUMENTS

| | | |
|---|---|---|
| EP | 3637909 A1 | 4/2020 |
| WO | 2018208087 A1 | 11/2018 |

OTHER PUBLICATIONS

International Search Report and Written Opinion—PCT/US2020/038519—ISA/EPO—dated Sep. 30, 2020.
Co-Pending U.S. Appl. No. 16/904,207, filed Jun. 17, 2020.

*Primary Examiner* — Peter P Chau
(74) *Attorney, Agent, or Firm* — Danai Nelisile Mhembere; Patterson & Sheridan, LLP

(57) ABSTRACT

Certain aspects of the present disclosure provide techniques for cross-carrier repetition. A method that may be performed by a user equipment (UE) includes monitoring for an initial transmission of data from a network on a first entity, receiving control information indicating second entities for receiving retransmission repetitions of the data, and receiving the retransmission repetitions of the data via the second entities.

20 Claims, 29 Drawing Sheets

(56) References Cited

U.S. PATENT DOCUMENTS

| | | |
|---|---|---|
| 2018/0234881 A1 | 8/2018 | Hosseini et al. |
| 2018/0278371 A1 | 9/2018 | Chien et al. |
| 2018/0288746 A1* | 10/2018 | Zhang ............... H04L 5/0048 |
| 2019/0098640 A1* | 3/2019 | Holakouei ........... H04L 5/0032 |
| 2019/0230691 A1* | 7/2019 | Cao .................. H04L 5/0042 |
| 2020/0092856 A1* | 3/2020 | Horiuchi ............. H04L 1/0075 |

* cited by examiner

TECHNIQUES FOR CROSS-CARRIER REPETITION

CROSS-REFERENCE TO RELATED APPLICATION(S)

This application claims benefit of and priority to U.S. Provisional Application No. 62/867,655, filed Jun. 27, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for data repetition.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly.

Certain aspects are directed to a method for wireless communication. The method generally includes monitoring for an initial transmission of data from a network on a first entity, receiving control information indicating second entities for receiving retransmission repetitions of the data, wherein one or more of the second entities are different than the first entity, and receiving the retransmission repetitions of the data via the second entities.

Certain aspects are directed to a method for wireless communication. The method generally includes transmitting an initial transmission of data to a user-equipment (UE) on a first entity, transmitting control information indicating second entities for receiving retransmission repetitions of the data, wherein one or more of the second entities are different than the first entity, and transmitting the retransmission repetitions of the data via the second entities.

Certain aspects are directed to a method for wireless communication. The method generally includes transmitting an initial transmission of data to a network on a first entity, receiving control information indicating second entities for transmitting retransmission repetitions of the data, wherein one or more of the second entities are different than the first entity, and transmitting the retransmission repetitions of the data via the second entities in accordance with the control information.

Certain aspects are directed to a method for wireless communication. The method generally includes receiving an initial transmission of data from a UE on a first entity, transmitting control information indicating second entities for transmitting retransmission repetitions of the data, wherein one or more of the second entities are different than the first entity, and receiving the retransmission repetitions of the data via the second entities.

Certain aspects are directed to an apparatus for wireless communication. The apparatus generally includes a memory and one or more processors coupled to the memory, the one or more processors and the memory being configured to: monitor for an initial transmission of data from a network on a first entity, receive control information indicating second entities for receiving retransmission repetitions of the data, wherein one or more of the second entities are different than the first entity, and receive the retransmission repetitions of the data via the second entities.

Certain aspects are directed to an apparatus for wireless communication. The apparatus generally includes means for monitoring for an initial transmission of data from a network on a first entity, means for receiving control information indicating second entities for receiving retransmission repetitions of the data, wherein one or more of the second entities are different than the first entity, and means for receiving the retransmission repetitions of the data via the second entities.

Certain aspects are directed to a computer readable medium. The computer readable medium generally includes code for monitoring for an initial transmission of data from a network on a first entity, code for receiving control information indicating second entities for receiving retransmission repetitions of the data, wherein one or more of the second entities are different than the first entity, and code for receiving the retransmission repetitions of the data via the second entities.

Certain aspects are directed to an apparatus for wireless communication. The apparatus generally includes a memory and one or more processors coupled to the memory, the one or more processors and the memory being configured to: transmit an initial transmission of data to a UE on a first entity, transmit control information indicating second entities for receiving retransmission repetitions of the data, wherein one or more of the second entities are different than the first entity; and transmit the retransmission repetitions of the data via the second entities.

Certain aspects are directed to an apparatus for wireless communication. The apparatus generally includes means for transmitting an initial transmission of data to a UE on a first entity, means for transmitting control information indicating second entities for receiving retransmission repetitions of the data, wherein one or more of the second entities are different than the first entity, and means for transmitting the retransmission repetitions of the data via the second entities.

Certain aspects are directed to a computer readable medium. The computer readable medium generally includes code transmitting an initial transmission of data to a UE on a first entity, code for transmitting control information indicating second entities for receiving retransmission repetitions of the data, wherein one or more of the second entities are different than the first entity, and code for transmitting the retransmission repetitions of the data via the second entities.

Certain aspects are directed to an apparatus for wireless communication. The apparatus generally includes a memory and one or more processors coupled to the memory, the one or more processors and the memory being configured to: transmit an initial transmission of data to a network on a first entity, receive control information indicating second entities for transmitting retransmission repetitions of the data, wherein one or more of the second entities are different than the first entity, and transmit the retransmission repetitions of the data via the second entities in accordance with the control information.

Certain aspects are directed to an apparatus for wireless communication. The apparatus generally includes means for transmitting an initial transmission of data to a network on a first entity, means for receiving control information indicating second entities for transmitting retransmission repetitions of the data, wherein one or more of the second entities are different than the first entity, and means for transmitting the retransmission repetitions of the data via the second entities in accordance with the control information.

Certain aspects are directed to a computer readable medium. The computer readable medium generally includes code for transmitting an initial transmission of data to a network on a first entity, code for receiving control information indicating second entities for transmitting retransmission repetitions of the data, wherein one or more of the second entities are different than the first entity, and code for transmitting the retransmission repetitions of the data via the second entities in accordance with the control information.

Certain aspects are directed to an apparatus for wireless communication. The apparatus generally includes a memory and one or more processors coupled to the memory, the one or more processors and the memory being configured to: receive an initial transmission of data from a UE on a first entity, transmit control information indicating second entities for transmitting retransmission repetitions of the data, wherein one or more of the second entities are different than the first entity, and receive the retransmission repetitions of the data via the second entities.

Certain aspects are directed to an apparatus for wireless communication. The apparatus generally includes means for receiving an initial transmission of data from a UE on a first entity, means for transmitting control information indicating second entities for transmitting retransmission repetitions of the data, wherein one or more of the second entities are different than the first entity, and means for receiving the retransmission repetitions of the data via the second entities.

Certain aspects are directed to a computer readable medium. The computer readable medium generally includes code for receiving an initial transmission of data from a UE on a first entity, code for transmitting control information indicating second entities for transmitting retransmission repetitions of the data, wherein one or more of the second entities are different than the first entity, and code for receiving the retransmission repetitions of the data via the second entities.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
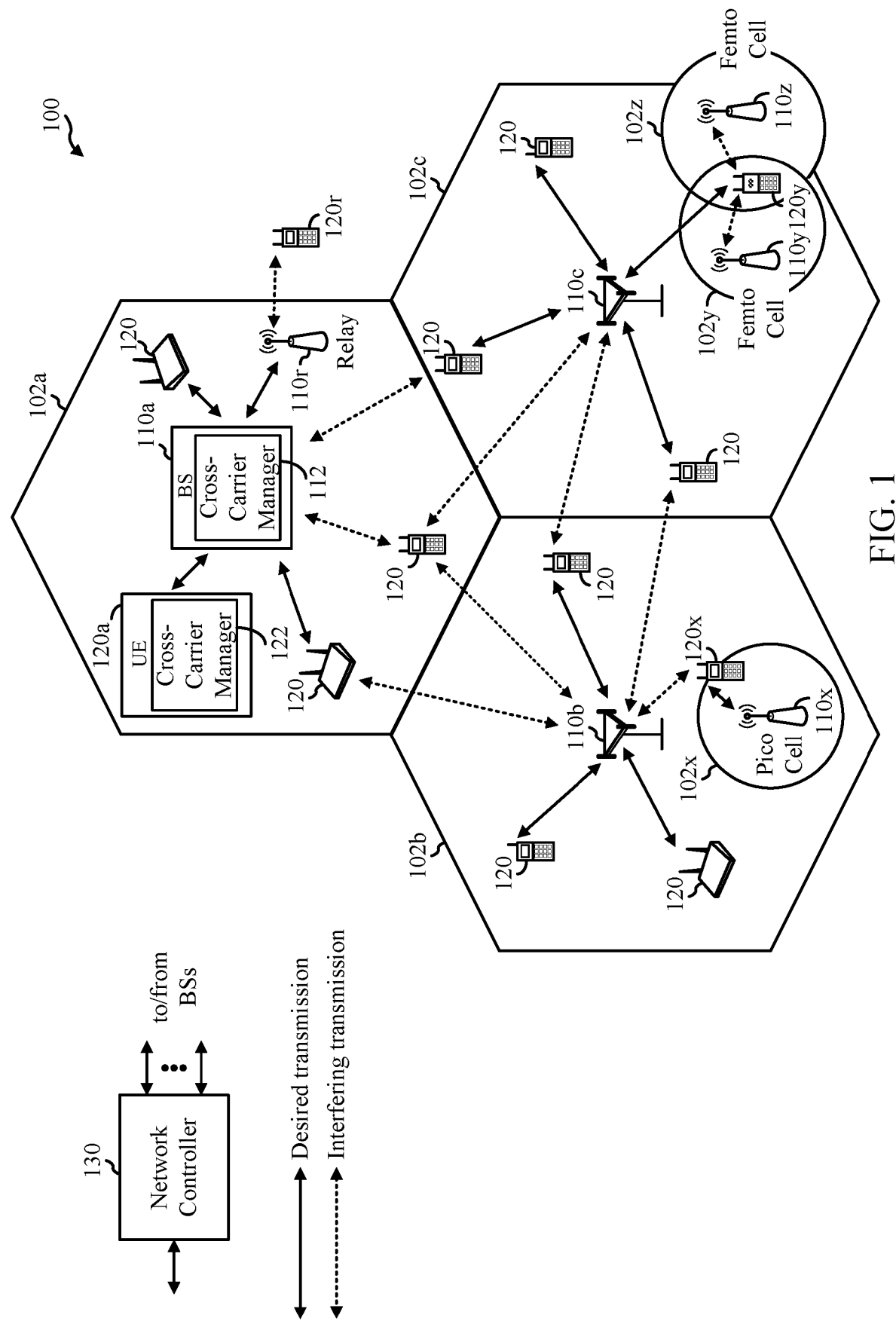
FIG. 1 is a block diagram conceptually illustrating an example telecommunications system, in accordance with certain aspects of the present disclosure.

Aspects of the present disclosure provide apparatus, methods, processing systems, and computer readable mediums for cross-carrier repetition. For instance, repetitions of a data transmission may be sent using multiple entities. As used herein, the term "entity" generally refers to a frequency resource, component carrier, or cell.

The data transmission may include an uplink or downlink data transmission. For instance, for downlink data transmission, a user-equipment (UE) may receive control information scheduling data repetitions of the data if decoding of an initial data transmission has failed. The repetitions of the data may be combined to facilitate decoding at the UE, as described in more detail herein. Similarly, for uplink data transmission, the UE may receive control information scheduling uplink data repetitions if decoding of an initial uplink data transmission has failed at the base station (BS) (e.g., next generation Node B (gNB)). In some cases, the control information may be carried in separate control messages, which may be independent or correlated. In other cases, the control information scheduling the various repetitions may be carried in a single control message.

In some cases, the control information may include various identifiers, such as a hybrid automatic request (HARQ) process identification (ID) and HARQ anchoring cell ID that facilitates the transmission of the data repetitions and decoding of the data repetitions, as described in more detail herein. In certain aspects, independent or common acknowledgement/negative acknowledgement (A/N) message may be sent to indicate whether one or more of the data repetitions have been successfully decoded at the UE.

The following description provides examples of traffic burst awareness in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for cross-carrier repetition. As shown in FIG. 1, the BS 110a includes a cross-carrier manager 112. The cross-carrier manager 112 may be configured to perform cross-carrier repetitions, in accordance with aspects of the present disclosure. As shown in FIG. 1, the UE 120a includes a cross-carrier manager 122. The cross-carrier manager 122 may be configured to configure cross-carrier repetitions, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
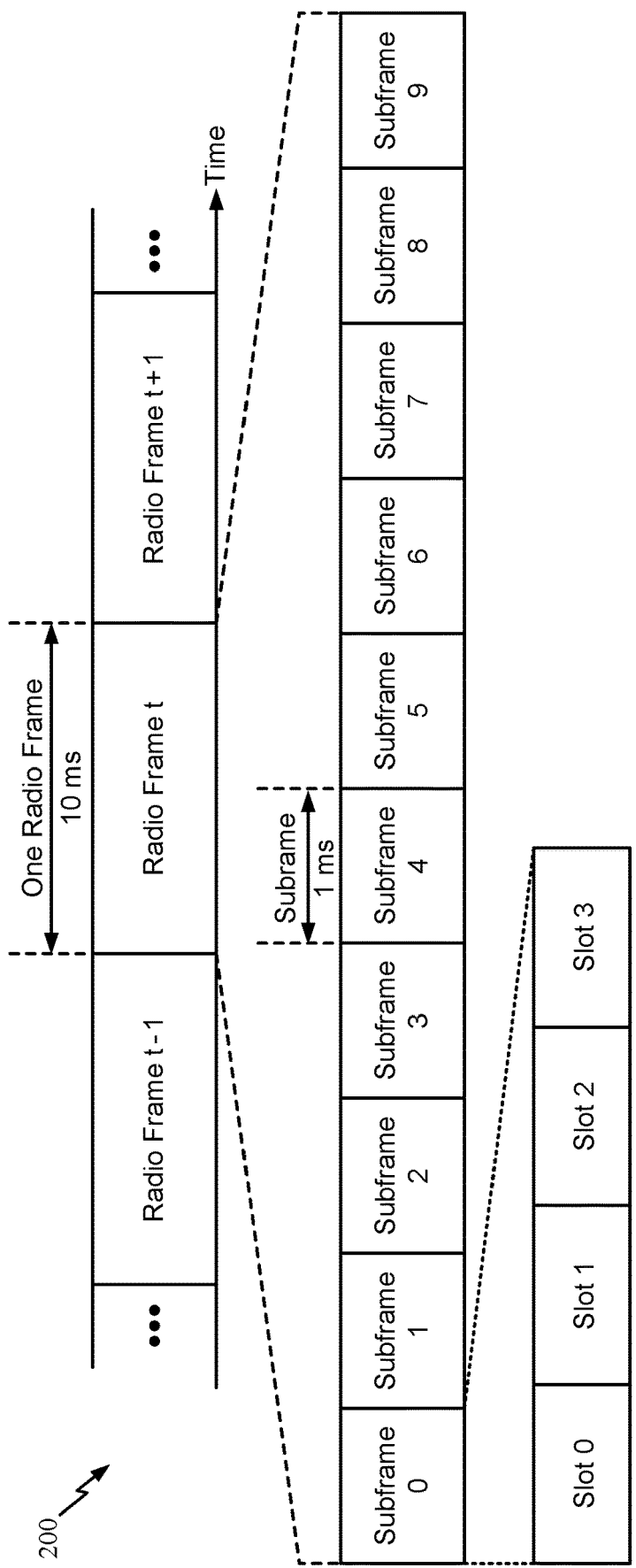
FIG. 2 is a diagram showing an example of a frame format.

FIG. 2 is a diagram showing an example of a frame format 200. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). In certain aspects, a subframe of the frame format 200 may be implemented using cross-carrier scheduling, as described in more detail herein.

Figure 3:
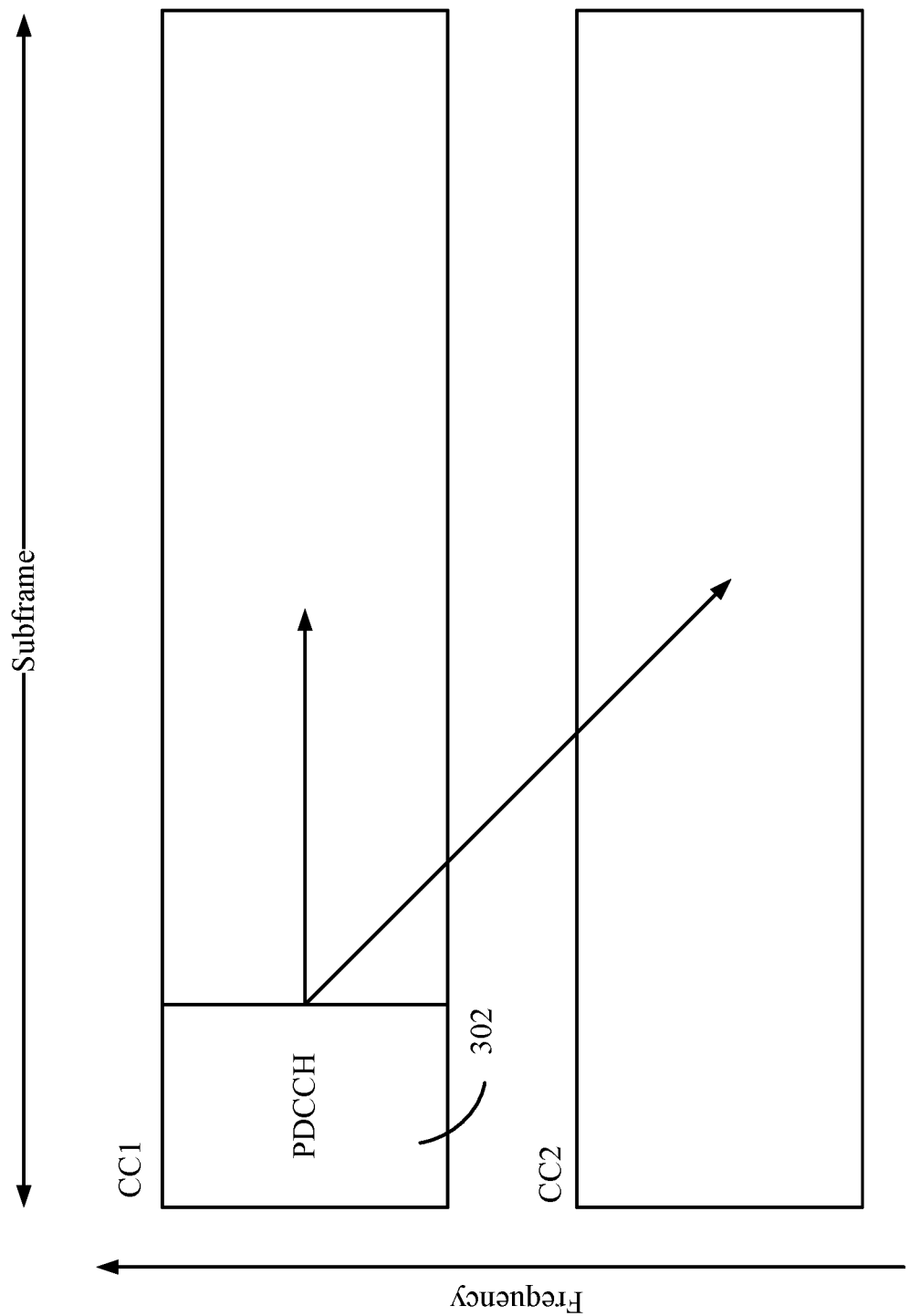
FIG. 3 illustrates example operations for cross-carrier scheduling.

FIG. 3 illustrates example operations for cross-carrier scheduling. As illustrated, the first component carrier (CC1) may include a physical downlink control channel (PDCCH) 302 that includes control information applicable to both CC1 and the second component carrier (CC2). For instance, CC1 may schedule resources for data transmission in both CC1 and CC2. CC1 may be referred to as the scheduling CC and CC2 may be referred to as the scheduled CC. Each component carrier is associated with a cell. While only two CCs are illustrated in FIG. 3, any number of CCs may be implemented, each of the CCs being associated with a frequency range (FR). In some cases, multiple CCs may be part of the same FR. For instance, CC1 may use a first FR (FR1) and CC2 may use a second FR (FR2). A configuration of each FR may be different. For instance, FR1 may have a smaller bandwidth (BW) than FR2, yet have less blocking issues. FR1 may have a lower sub-carrier spacing (SCS) than FR2. For example, FR1 may have a SCS of 60, whereas FR2 may have a SCS of 120.

Example Techniques for Cross-Carrier Repetitions

Certain aspects of the present disclosure are generally directed to cross-carrier repetitions. For instance, repetitions of a data transmission may be sent using several componentcarriers. The data transmission may include uplink or downlink data transmissions. For downlink data transmission, the repetitions of the data may be combined to facilitate decoding at the user-equipment (UE). While various examples provided herein are described with respect to frequency resources, cells, or component carriers to facilitate understanding, the aspects of the present disclosure may be implemented for any entity. As used herein, the term "entity" generally refers to a frequency resource, cell, or component carrier (e.g., frequency resource, cell, or component carrier). A repetition of a data transmission generally refers to a retransmission of at least a portion (e.g., one or more transport blocks (TBs)) of the data transmission or a different redundancy version of at least a portion of the data transmission. The data repetitions may be combined to facilitate decoding of the data.

Figure 4:
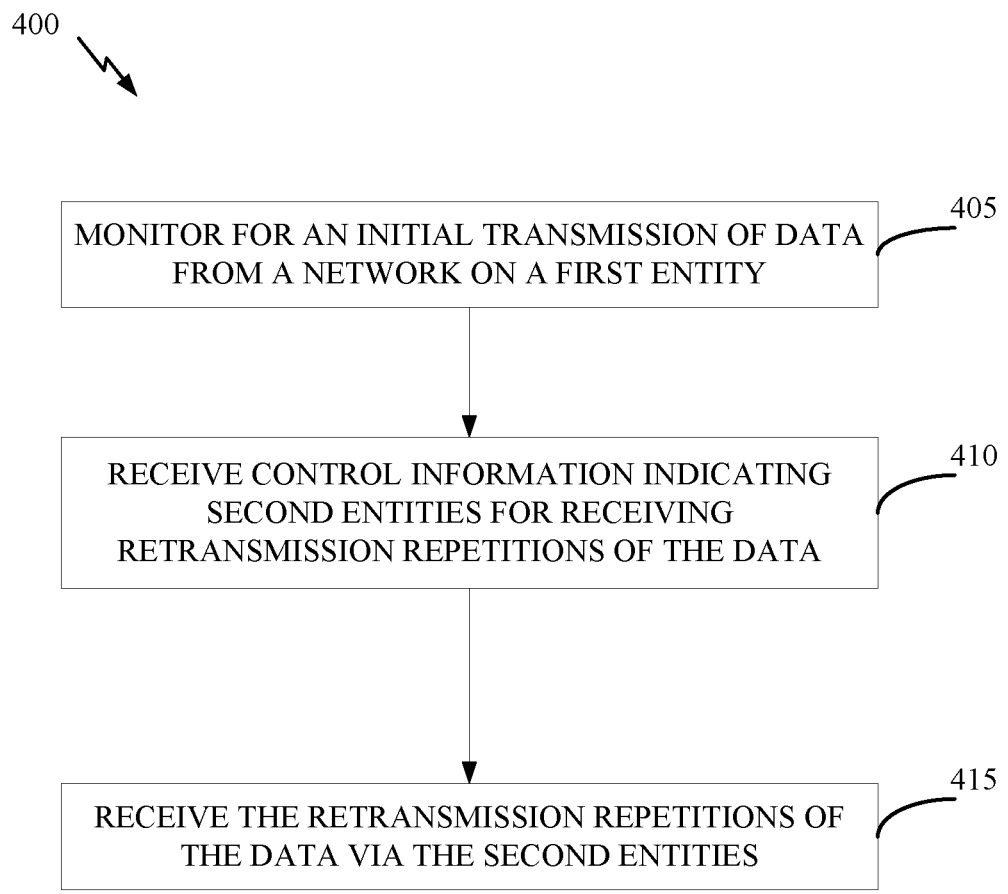
FIG. 4 is a flow diagram illustrating example operations for wireless communication by a user equipment (UE), in accordance with certain aspects of the present disclosure.

FIG. 4 is a flow diagram illustrating example operations 400 for wireless communication, in accordance with certain aspects of the present disclosure. The operations 400 may be performed, for example, by a UE (e.g., such as a UE 120a in the wireless communication network 100).

Figure 17:
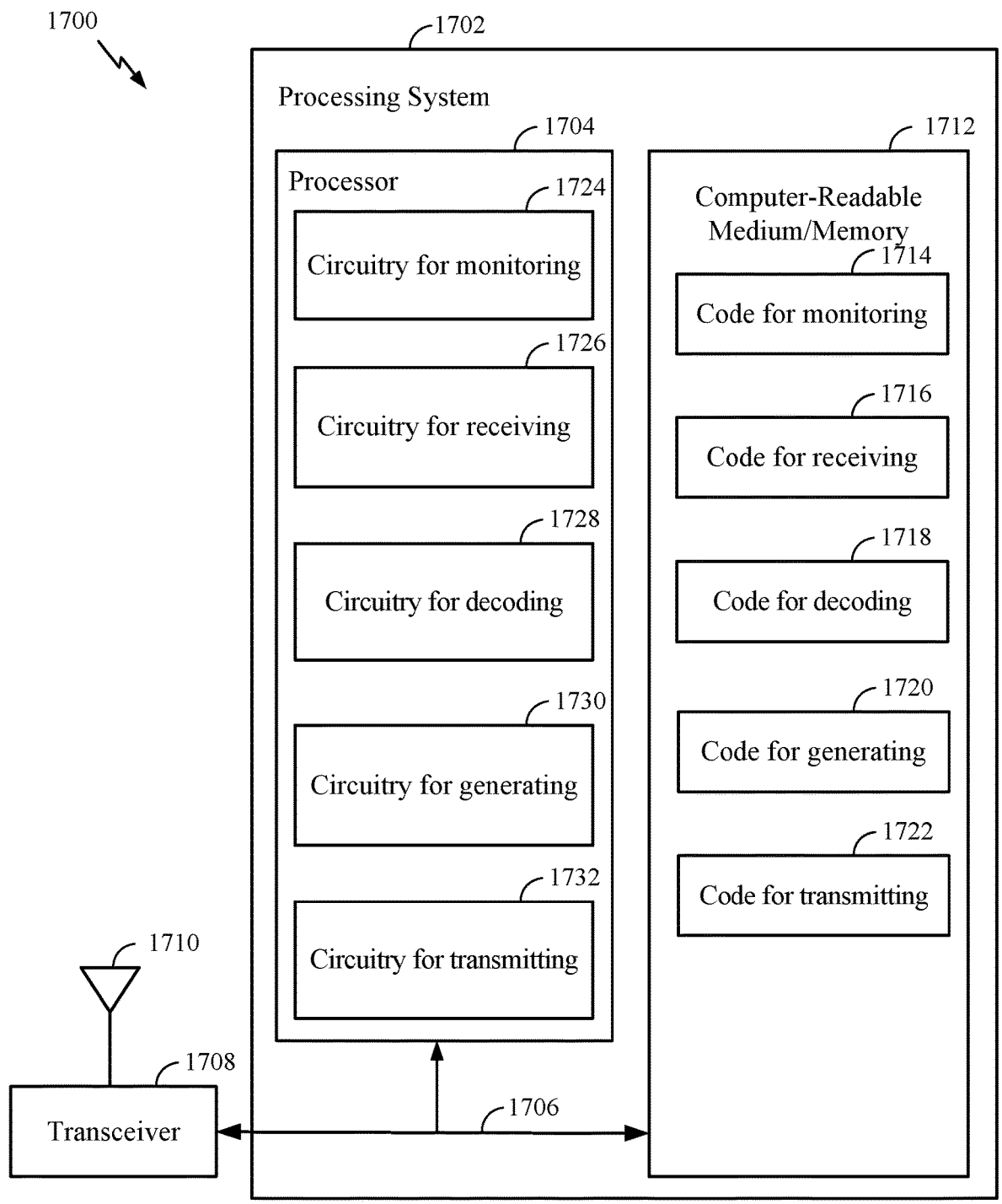
FIG. 17 illustrates a communications device that may include various components configured to perform operations for the techniques disclosed herein in accordance with aspects of the present disclosure.

Operations 400 may be implemented as software components that are executed and run on one or more processors (e.g., controller/processor 1980 of FIG. 17). Further, the transmission and reception of signals by the UE in operations 400 may be enabled, for example, by one or more antennas (e.g., antennas 1952 of FIG. 17). In certain aspects, the transmission and/or reception of signals by the UE may be implemented via a bus interface of one or more processors (e.g., controller/processor 1980) obtaining and/or outputting signals.

The operations 400 may begin at block 405, with the UE monitoring for an initial transmission of data from a network on a first entity. At block 410, the UE receives control information indicating second entities for receiving retransmission repetitions of the data. At block 415, the UE receives the retransmission repetitions of the data via the second entities. In certain aspects, one or more of the second entities may be different than the first entity. As used herein, the term "entity" generally refers to a frequency resource, cell, or component carrier.

In certain aspects, the control information may be received via separate control messages (e.g., separate physical downlink control channels (PDCCHs)), each of the control messages being received prior to a respective one of the retransmission repetitions of the data. Each of the control messages may indicate the second entities for receiving the retransmission repetitions. In some case, the control messages may be correlated. For example, at least one of the control messages may indicate resources allocated for receiving another one of the control messages. Each of the control messages may indicate a respective one of the second entities.

In certain aspects, the control information may be received via a single control message indicating the second entities for receiving the retransmission repetitions of the data. In this case, the control information may include a retransmission allocation index indicating the second entities for receiving the retransmission repetitions of the data.

In certain aspects, the repetitions of the data may be combined to facilitate decoding at the UE. For example, the retransmission repetitions of the data may include a first retransmission repetition of the data and a second retransmission repetition of the data. The UE may decode the first retransmission repetition by combining the first retransmission repetition of the data and the initial transmission of the data, and generate a first acknowledgement/negative acknowledgement (A/N) message indicating whether the decoding of the first retransmission repetition of the data was successful. The UE may also decode the second retransmission repetition by combining the first retransmission repetition of the data, the second retransmission repetition of the data, and the initial transmission of the data. The UE may then generate a second A/N message indicating whether the decoding of the second retransmission repetition of the data was successful. The UE may transmit the first A/N message and the second A/N message to the network entity.

In some cases, the A/N bit locations may be decided based on the data repetition location with respect to the uplink (UL) feedback channel (e.g., a physical uplink control channel (PUCCH)). For example, the first A/N message may be carried in a first A/N codebook, and bit locations of the first A/N message in the first A/N codebook may correspond to one of the second entities associated with the first retransmission repetition. The second A/N message may be carried in a second A/N codebook, and bit locations of the second A/N message in the second A/N codebook may correspond to another one of the second entities associated with the second retransmission repetition. In some cases, the first and second A/N messages may be carried by same or different UL A/N feedback resources (e.g., same or different PUCCHs). Each of the different UL A/N feedback resources may be configured for each of the first and second entities for receiving each of the retransmission repetitions. In certain aspects, the same UL A/N feedback resources may be configured for all or one of the first and second entities receiving retransmission repetitions.

In certain aspects, a common A/N message may be used. For example, the retransmission repetitions of the data may include a first retransmission repetition of the data and a second retransmission repetition of the data. The UE may decode the retransmission repetitions by combining the first retransmission repetition of the data, the second retransmission repetition of the data, and the initial transmission of the data. The UE may then generate an A/N message indicating whether the decoding of the retransmission repetitions of the data was successful, and transmit the A/N message to the network. In certain aspects, the A/N message is carried in an A/N codebook, and bit locations of the A/N message in the A/N codebook are determined based on one of the second entities for the retransmission repetitions of the data. In some cases, the control information may indicate the one of the second entities based on which resources for transmission of the A/N message is determined. In certain aspects, the A/N message may be carried by same or different UL A/N feedback resources. Each of the different UL A/N feedback resources may be configured for each of the first and second entities for receiving each of the retransmission repetitions. In some cases, the same UL A/N feedback resource may be configured for all or one of the first and second entities for receiving retransmission repetitions.

In certain aspects, the initial transmission of the data may be monitored for during a transmission occasion, and the retransmission repetitions of the data may be monitored for during a retransmission time window if the data is not successfully decoded during the transmission occasion. In certain aspects, the control information may include a hybrid automatic repeat request (HARQ) process identifier (ID) indicating the initial transmission of the data corresponding to the retransmission repetitions. The control information may also include a HARQ anchoring entity ID associated with the first entity. The HARQ process ID and the HARQ anchoring entity ID may facilitate decoding (combining) of the retransmission repetitions.

Figure 5:
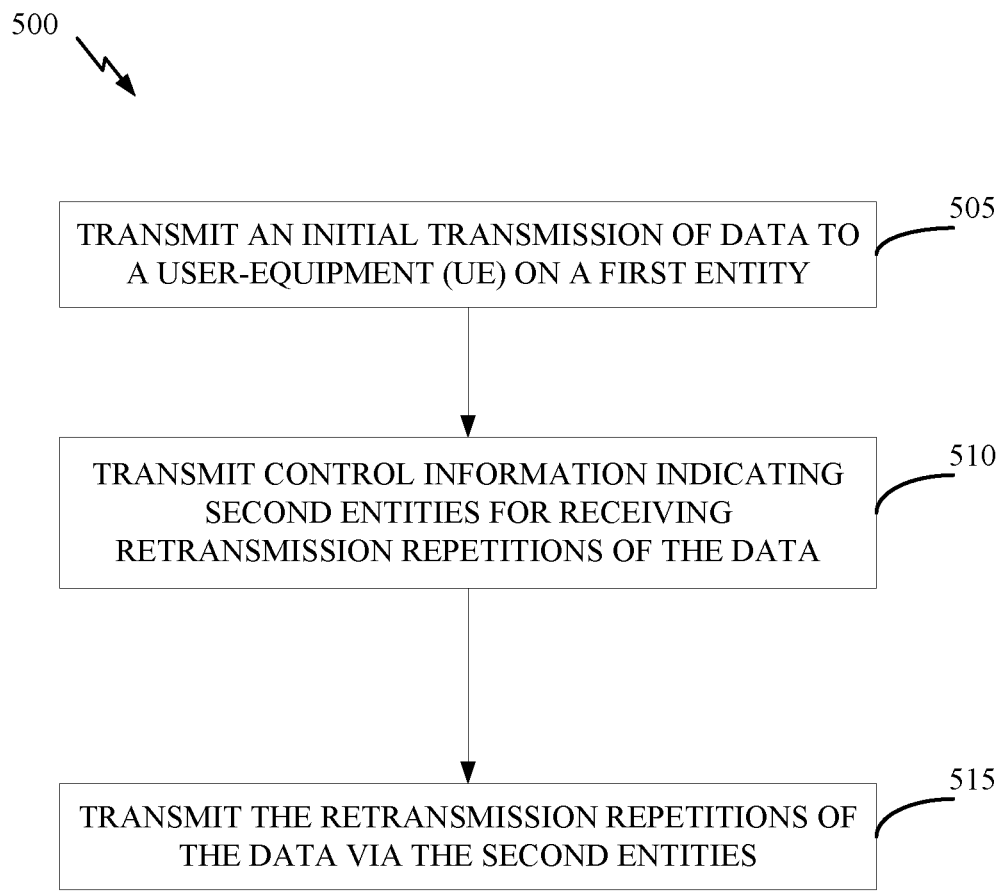
FIG. 5 is a flow diagram illustrating example operations for wireless communication by a base station (BS), in accordance with certain aspects of the present disclosure.

FIG. 5 is a flow diagram illustrating example operations 500 for wireless communication, in accordance with certain aspects of the present disclosure. The operations 500 may be performed, for example, by a base station (BS) (e.g., such as the BS 110a in the wireless communication network 100). The operations 500 may be complimentary operations by the BS to the operations 400 performed by the UE.

Operations 500 may be implemented as software components that are executed and run on one or more processors (e.g., controller/processor 1940 of FIG. 17). Further, the transmission and reception of signals by the BS in operations 500 may be enabled, for example, by one or more antennas (e.g., antennas 1934 of FIG. 17). In certain aspects, the transmission and/or reception of signals by the BS may be implemented via a bus interface of one or more processors (e.g., controller/processor 1940) obtaining and/or outputting signals.

The operations 500 may begin at block 505, by the BS transmitting an initial transmission of data to a UE on a first entity. At block 510, the BS transmits control information indicating second entities for receiving retransmission repetitions of the data. At block 515, the BS transmits the retransmission repetitions of the data via the second entities.

Figure 6:
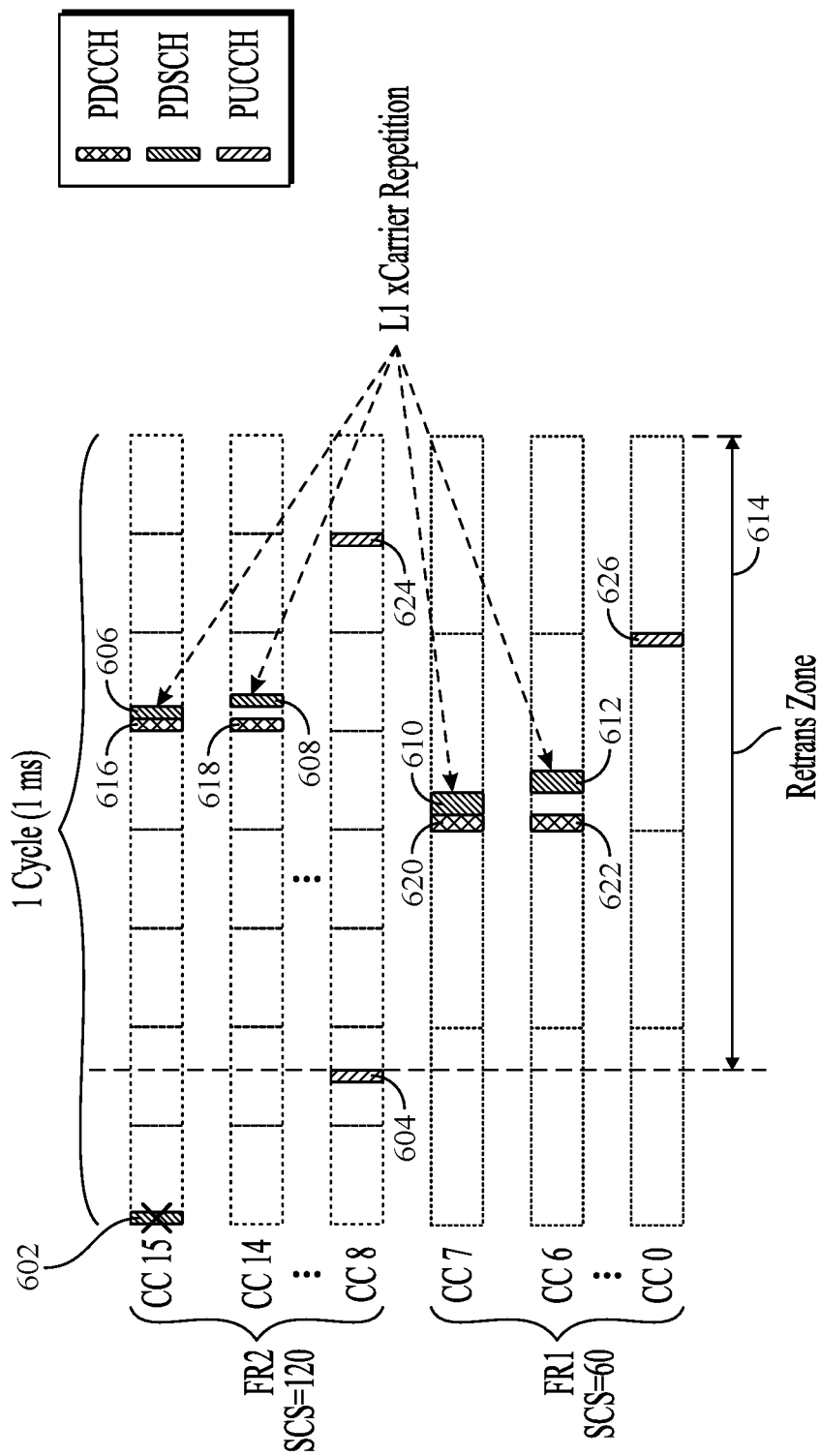
FIG. 6 illustrates cross-carrier repetitions, in accordance with certain aspects of the present disclosure.

FIG. 6 illustrates cross-carrier repetitions, in accordance with certain aspects of the present disclosure. For example, if an initial downlink/uplink (DL)/(UL) transmission fails, a retransmission may be dynamically repeated over any available CCs (or any entity, such as a cell, CC, or frequency resource), and is successful if any repetition goes through (e.g., is successfully decoded). Reliability in a tight timeline may be improved by opportunistically exploiting all available frequency resources when retransmission is needed. For example, as illustrated in FIG. 6, an initial data transmission 602 (e.g., a physical downlink shared channel (PDSCH)) may be received on a CC (e.g., CC15). The initial data transmission 602 may be scheduled using semi-persistent scheduling (SPS). An uplink control message 604 (e.g., PUCCH) may be sent indicating a negative acknowledgement. The negative acknowledgment may indicate that the initial data transmission 602 was not successfully decoded. During a retransmission occasion 614 (also referred to herein as a retransmission zone), repetitions of the initial data transmission 602 may be received. For example, data repetitions 606, 608, 610, 612 (also referred to herein as retransmission repetitions) may be sent during the retransmission occasion. In some cases, downlink control messages 616, 618, 620, 622 (e.g., PDCCH) may be transmitted prior to respective data repetitions 606, 608, 610, 612. In certain aspects, uplink control messages 624, 626 (PUCCH) may be sent, which may indicate whether the data repetitions were successfully decoded. As illustrated, the initial data transmission 602 may be sent on a first frequency range (FR1) and the second data repetitions may be sent on a second frequency range (FR2) having a lower SCS than the first FR.

Figure 7:
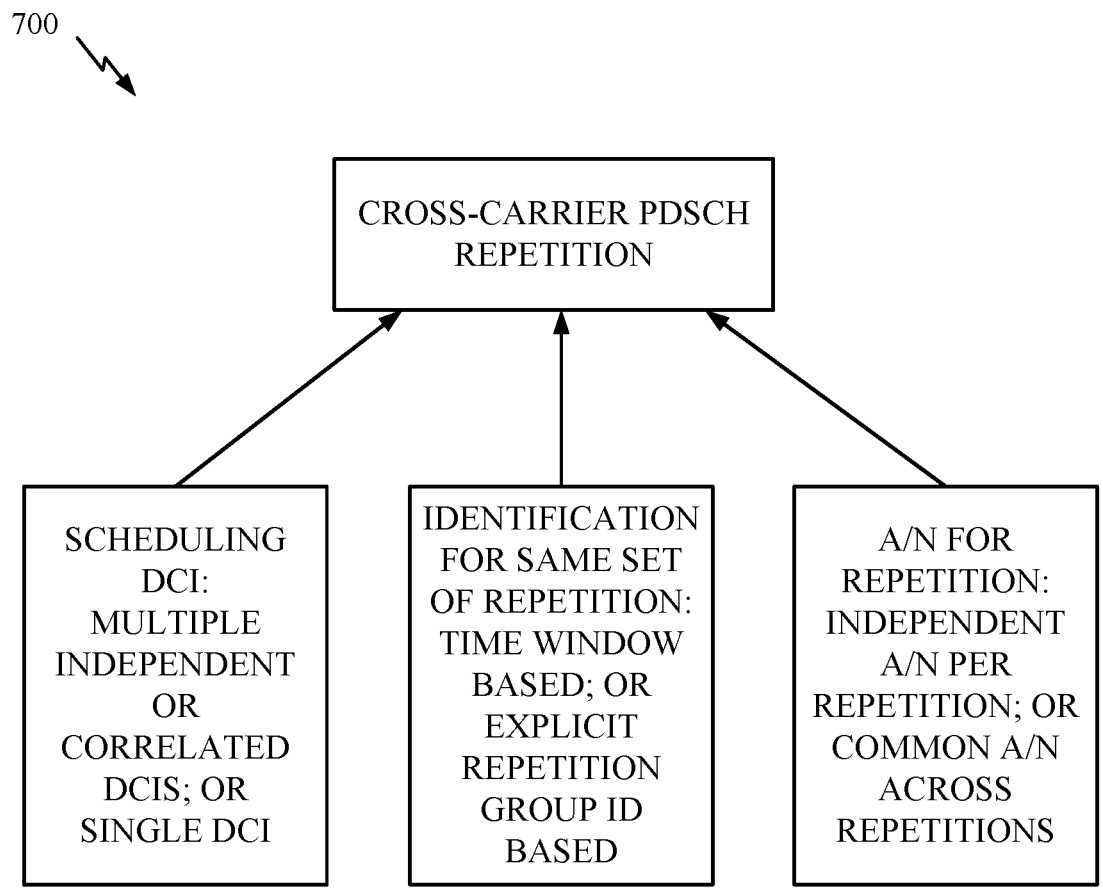
FIG. 7 illustrates various signaling aspects that may be implemented for cross-carrier data repetition, in accordance with certain aspects of the present disclosure.

FIG. 7 illustrates various signaling aspects 700 that may be implemented for cross-carrier PDSCH repetition, in accordance with certain aspects of the present disclosure. As illustrated, cross-carrier PDSCH repetition may be implemented with multiple variants depending on signaling choices, including scheduling DCI, A/N message for repetition, and identification for same set of repetition. For example, repetitions may be scheduled by a single DCI or multiple DCIs with independent or correlated scheduling information. A/N message per repetition may be implemented with common or independent A/N bits and bit locations in an A/N codebook carried by UL feedback channel, as described herein. Repetitions with the same payload may be identified by an explicit repetition group ID or by a certain time window for UE to combine. For instance, data repetitions to be combined at the UE may indicate the same group ID, allowing the UE to identify the repetitions to be combined, or the UE may be configured to combine repetitions during a preconfigured time window. The various signaling aspects are described in more detail herein.

Figure 8A:
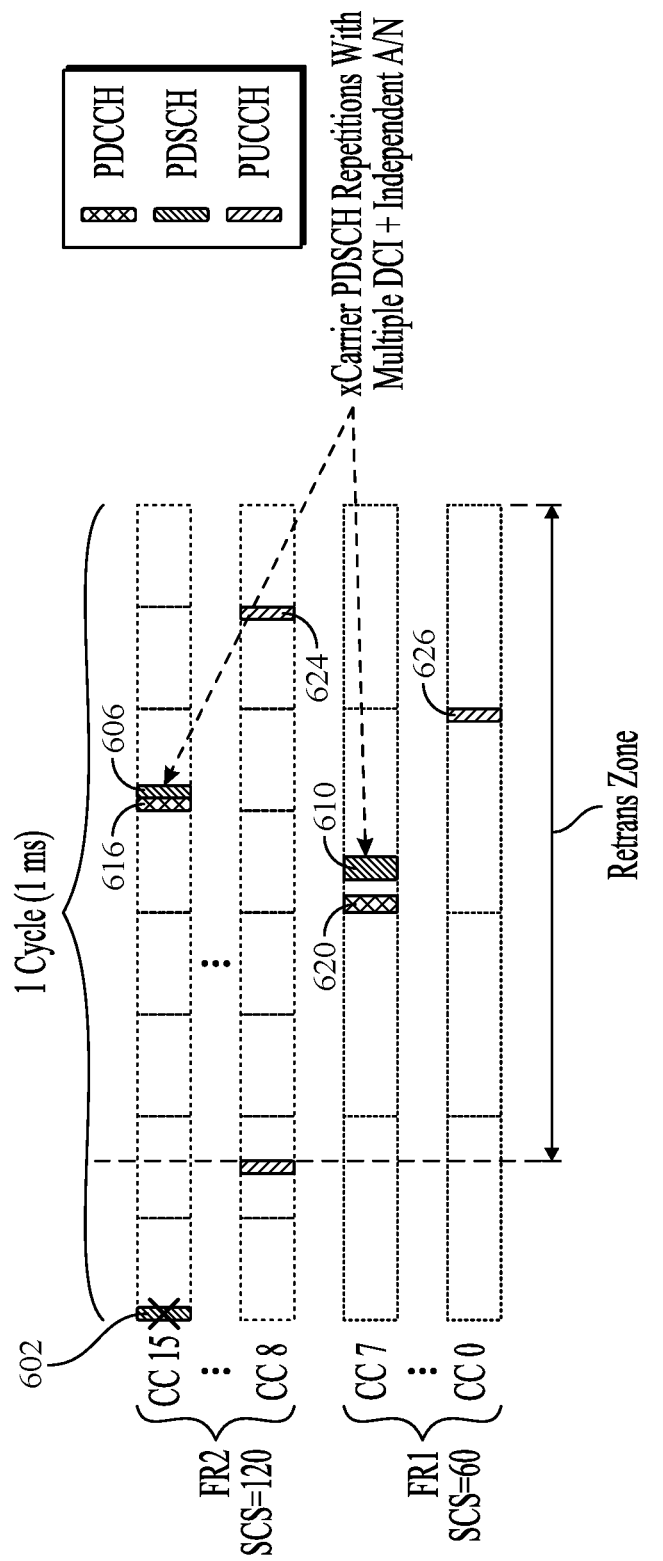
FIGS. 8A, 8B, and 8C illustrate cross-carrier data repetitions implemented with multiple control and independent acknowledgement/negative acknowledgement (A/N) messages, in accordance with certain aspects of the present disclosure.
Figure 8B:
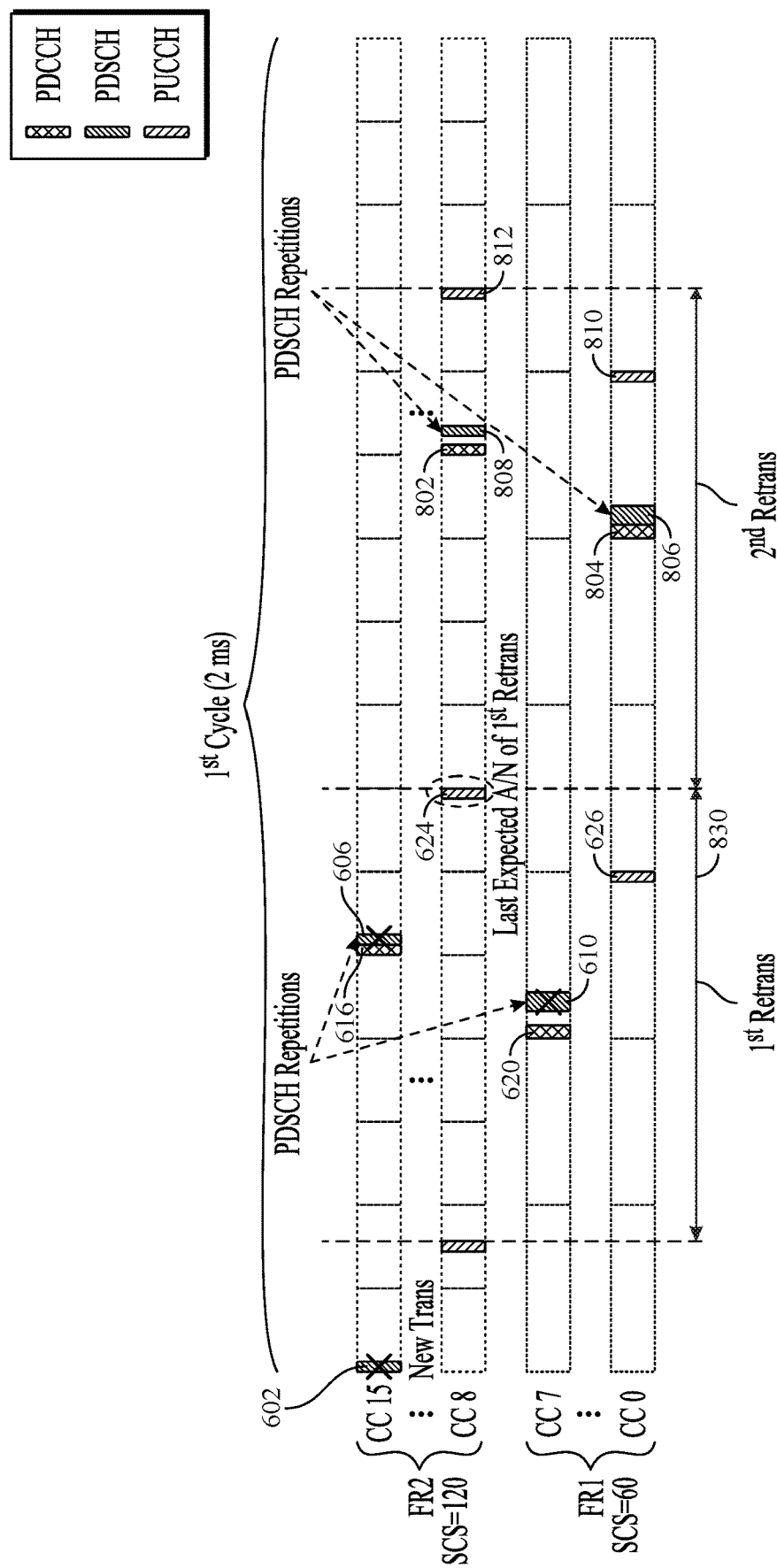
Figure 8C:
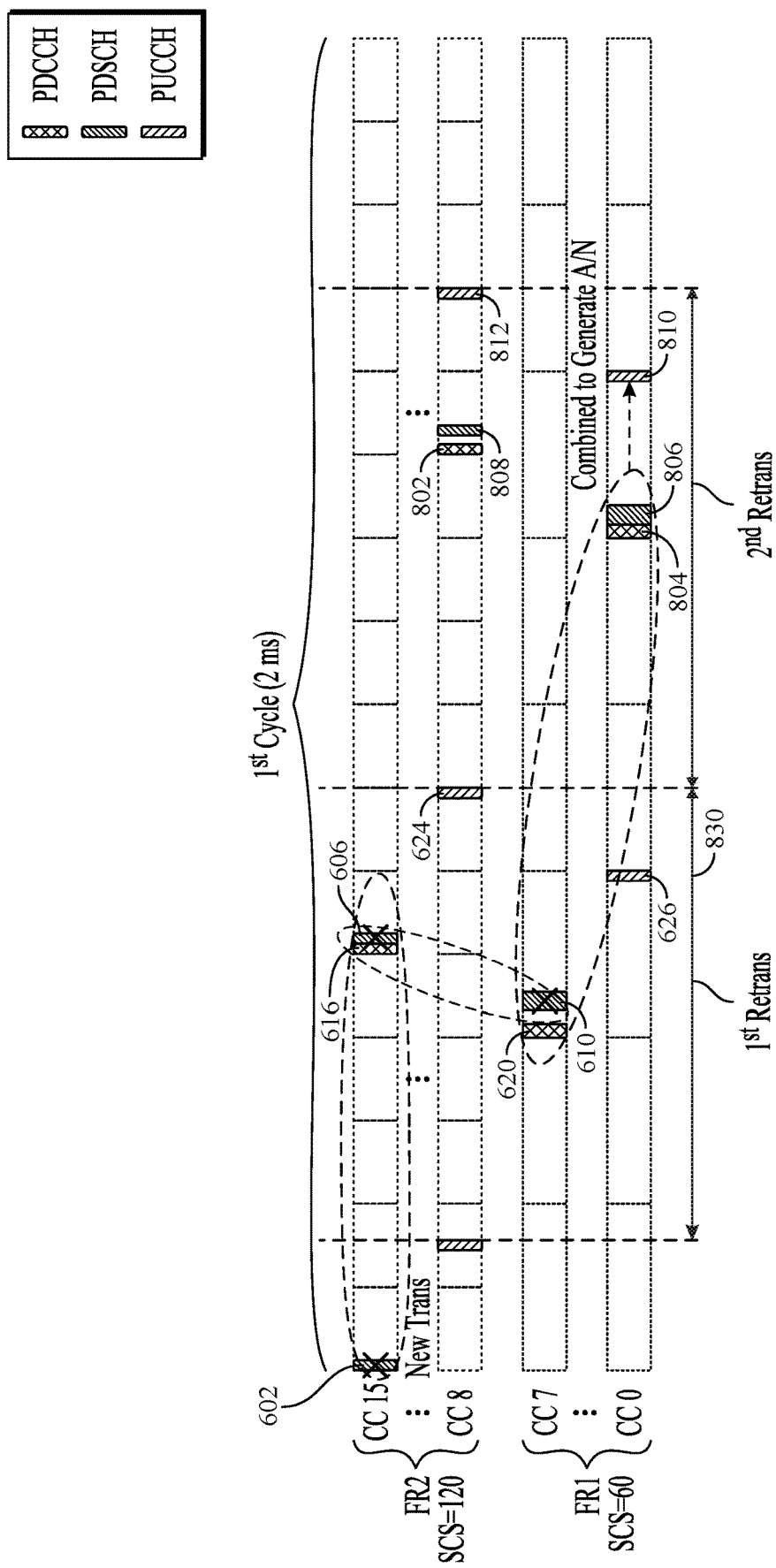

FIGS. 8A, 8B, and 8C illustrate cross-carrier data repetitions implemented with multiple DCIs and independent A/N messages, in accordance with certain aspects of the present disclosure. To provide diversity for both data and control, each PDSCH repetition may be scheduled by an individual DCI carried in separate PDCCHs, which may be on the same CC as the corresponding PDSCH repetition. As illustrated in FIG. 8A, each of the PDSCH repetitions (e.g., data repetitions 606, 610) may be associated with a corresponding A/N message in control messages 624, 626 (e.g., PUCCHs), respectively, carried by a PUCCH configured for the corresponding PDSCH receiving cell. A retransmission may be considered as successful as long as one repetition goes through (e.g., is successfully decoded). In certain aspects, to facilitate combining of the repetitions at least with a previous data transmission, each downlink control message (e.g., DCI) may indicate a HARQ-anchoring cell ID and HARQ process ID. The cell for transmitting PUCCH may be same or different for different PDSCH receiving cells, depending on a configuration for the cross-carrier repetitions. In other words, the PUCCH (e.g., control message 624) used to acknowledge the data repetition 606 may be on the same cell (e.g., CC) or a different cell (e.g., CC) than the data repetition 606.

FIG. 8B illustrates BS side operations for cross-carrier data repetitions, in accordance with certain aspects of the present disclosure. For example, for the same HARQ-anchoring cell ID and HARQ process ID, the BS 110 retransmits data repetitions 806, 808 (PDSCHs) if no acknowledgement (ACK) (e.g., in A/N message in control message 624 (PUCCH)) is received before the end of the last expected A/N transmission occasion (e.g., at the end of a first retransmission occasion 830) for the previous PDSCH repetitions (e.g., data repetitions 606, 610). A downlink control message 802, 804 (PDCCH) may be included prior to each of the data repetitions 806, 808 that schedule the resources for the data repetitions 806, 808. The BS 110 may schedule a new transmission after receiving the earliest ACK (e.g., in control message 810 (PUCCH)) across all repetitions during a retransmission occasion and the resources for the remaining repetitions may be canceled or reassigned for other traffic/UEs. The control messages 810, 812 (PUCCHs) may be used to acknowledge respective data repetitions 806, 808.

As illustrated in FIG. 8C, the UE 120 may attempt to decode individual PDSCH repetitions by combining log likelihood ratios (LLR) stored from previous transmissions for the same TB/code block group (CBG) (data) indicated in a corresponding DCI. For example, the data repetition 806 may be decoded by combining the data repetitions 806, 610, 606, and the initial data transmission 602, as illustrated. The downlink control message 804 may indicate the HARQ process ID and HARQ anchoring cell ID, allowing the UE to identify the data transmissions for the combination. As illustrated, the A/N in control message 810 (PUCCH) may be generated based on individual repetition decoding results.

Figure 9A:
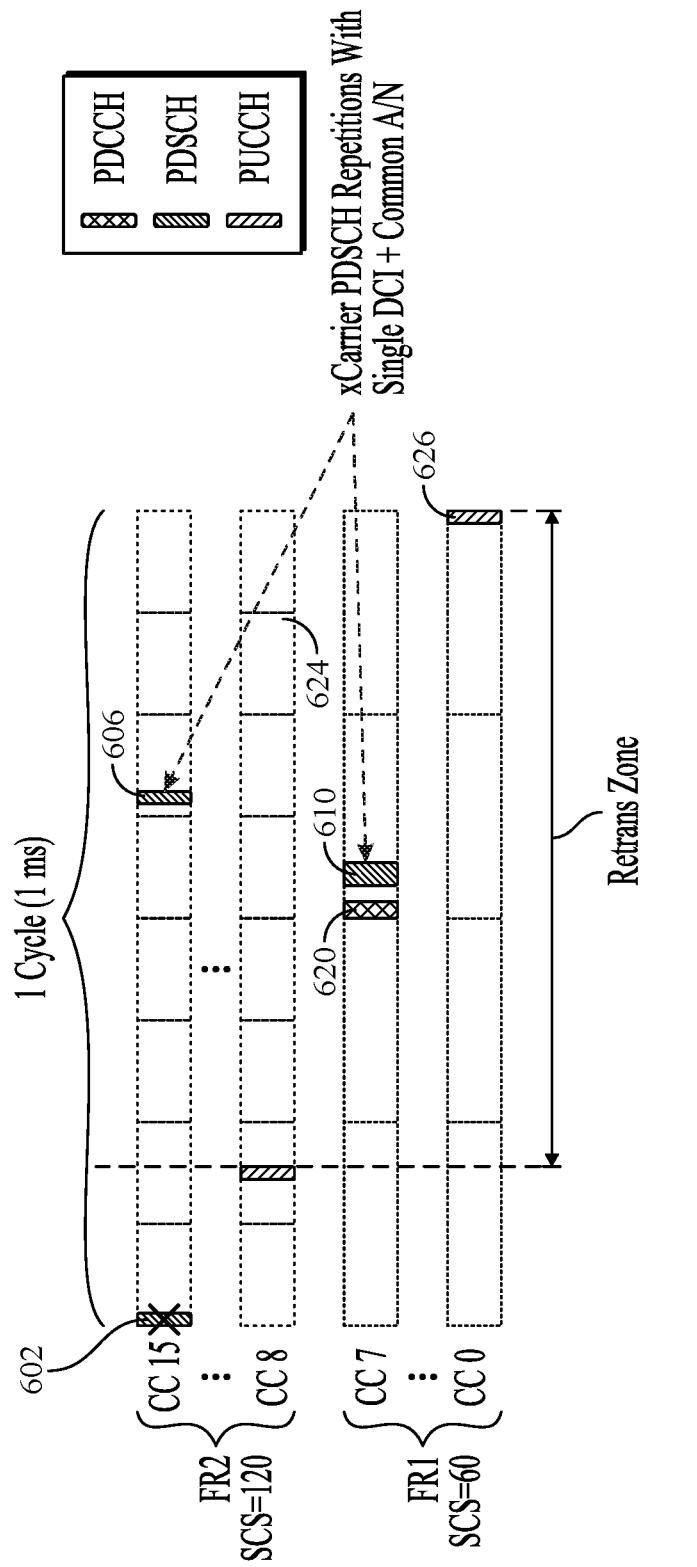
FIGS. 9A, 9B, and 9C illustrate cross-carrier data repetitions implemented with a single control message and a common A/N message, in accordance with certain aspects of the present disclosure.
Figure 9B:
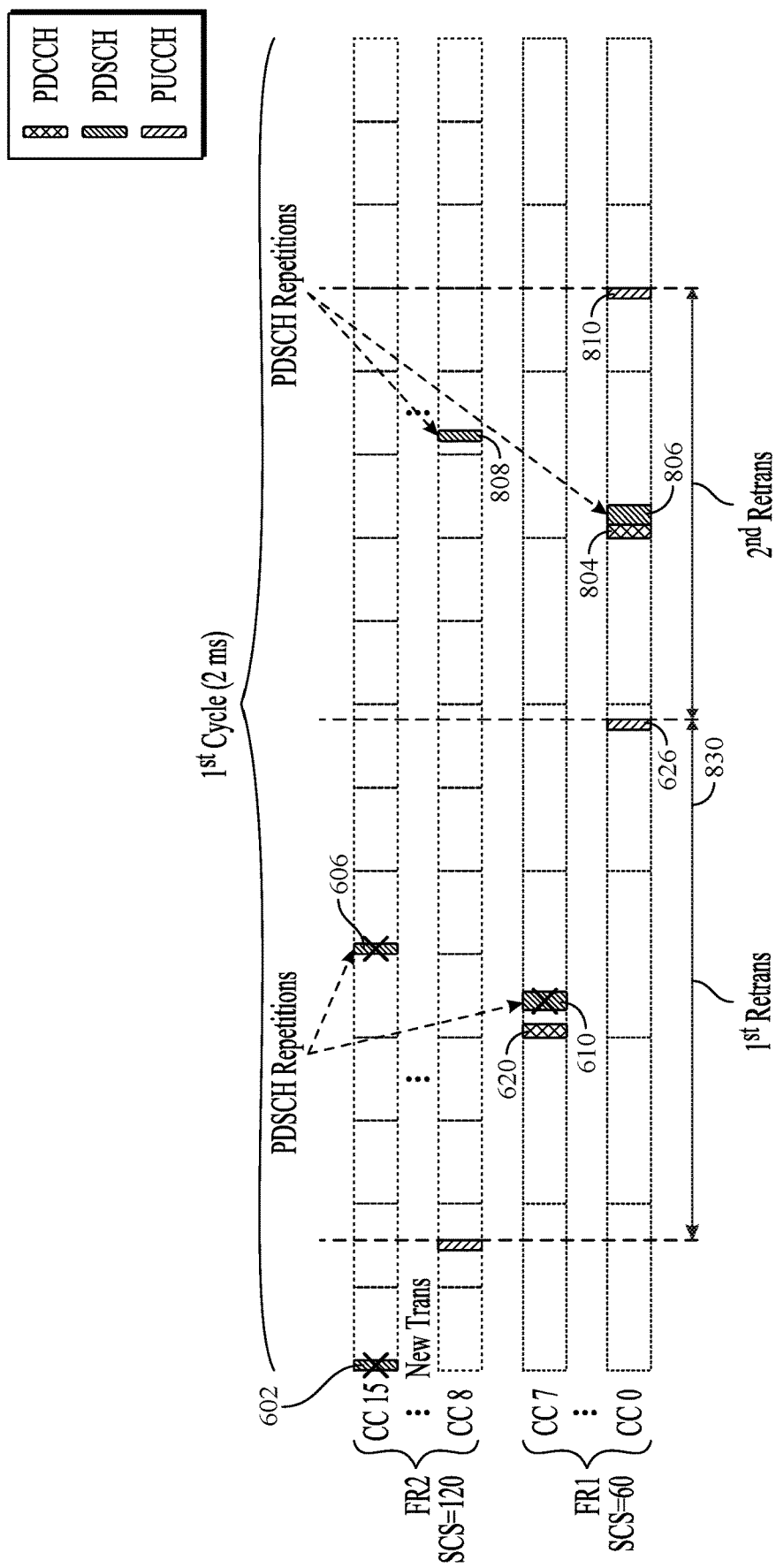
Figure 9C:
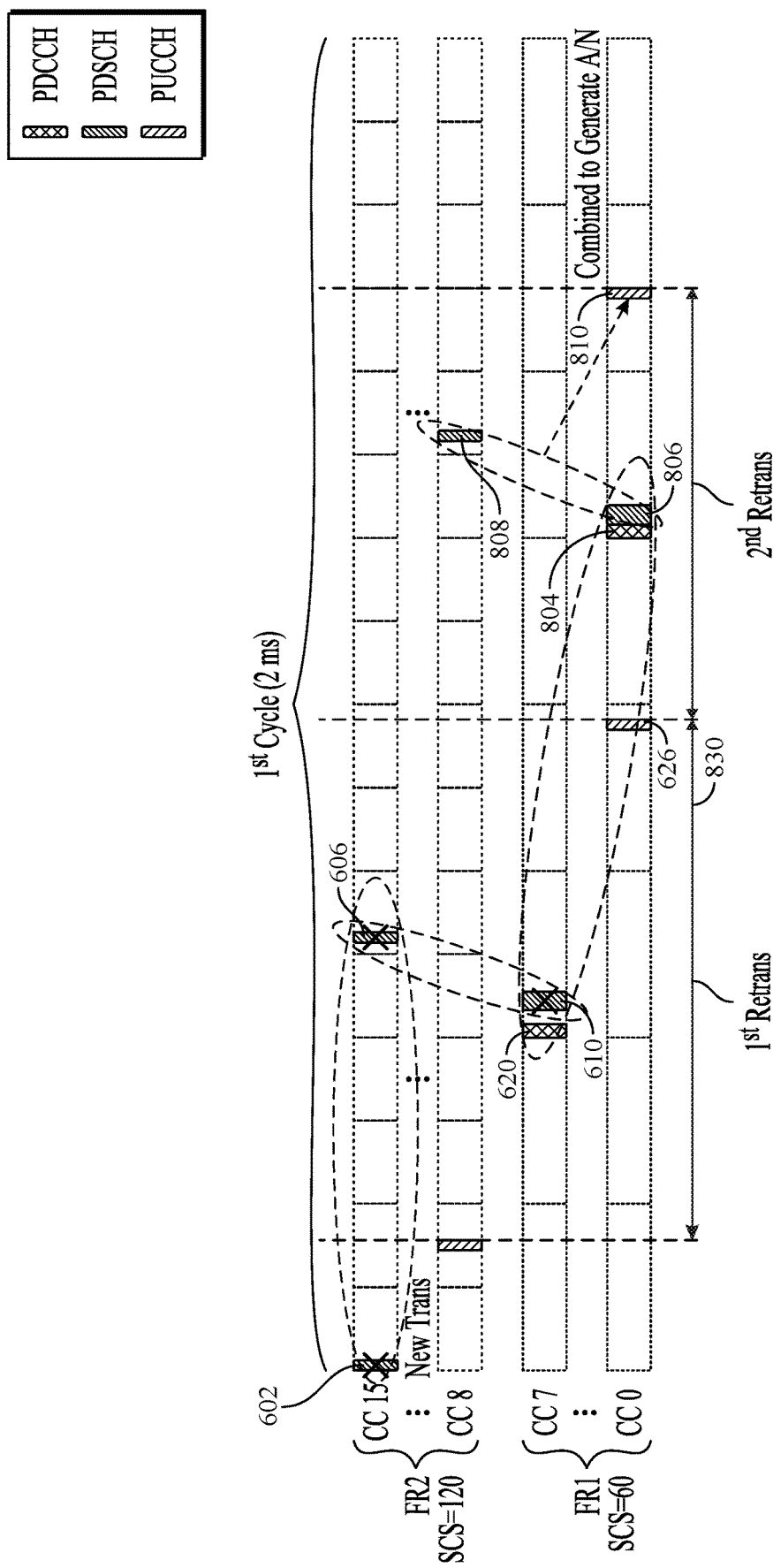

FIGS. 9A, 9B, and 9C illustrate cross-carrier data repetitions implemented with a single DCIs and a common A/N message, in accordance with certain aspects of the present disclosure. As illustrated in FIG. 9A, all PDSCH repetitions of a retransmission occasion may be scheduled by a single DCI in a control message (e.g., control message 620 (PDCCH)), and have common A/N bits carried by a single control message 626 (PUCCH) configured for one of the PDSCH repetition receiving cells (e.g. the cell with smallest SCS). The location of the A/N bits in the codebook may be based on one of the PDSCH repetition occasions (e.g., the last PDSCH repetition occasion such as data repetition 606). The single DCI (e.g., control message) may indicate the allocation per PDSCH, or a pre-configured repetition allocation index that corresponds to the allocation of the entity for the PDSCH repetition. As illustrated in FIG. 9B, for the same HARQ-anchoring cell ID and HARQ process ID, the BS retransmits PDSCH repetitions if no ACK is received on the only expected A/N transmission occasion (e.g., in control message 626 (PUCCH)) for the previous PDSCH repetitions (e.g., in retransmission occasion 830).

The time between each PDSCH repetition and a respective PUCCH should be at least N1 (e.g., a minimum time gap) for SCS of the repetition receiving cell. The minimum time gap will guarantee that the UE can generate a corresponding decoding result before the PUCCH transmission time.

As illustrated in FIG. 9C, after receiving DCI, the UE attempts to decode each TB/CBG (e.g., data) by combining LLR of all scheduled PDSCH repetitions as well as that stored from previous transmission(s) for the same TB/CBG. The A/N may be generated based on the single decoding result across all repetitions. In other words, the data repetitions 808, 806, 610, 606, and initial data transmission 602 may be combined for decoding, and decoding results may be used to generate the A/N message to be transmitted via the control message 810 (PUCCH).

Figure 10A:
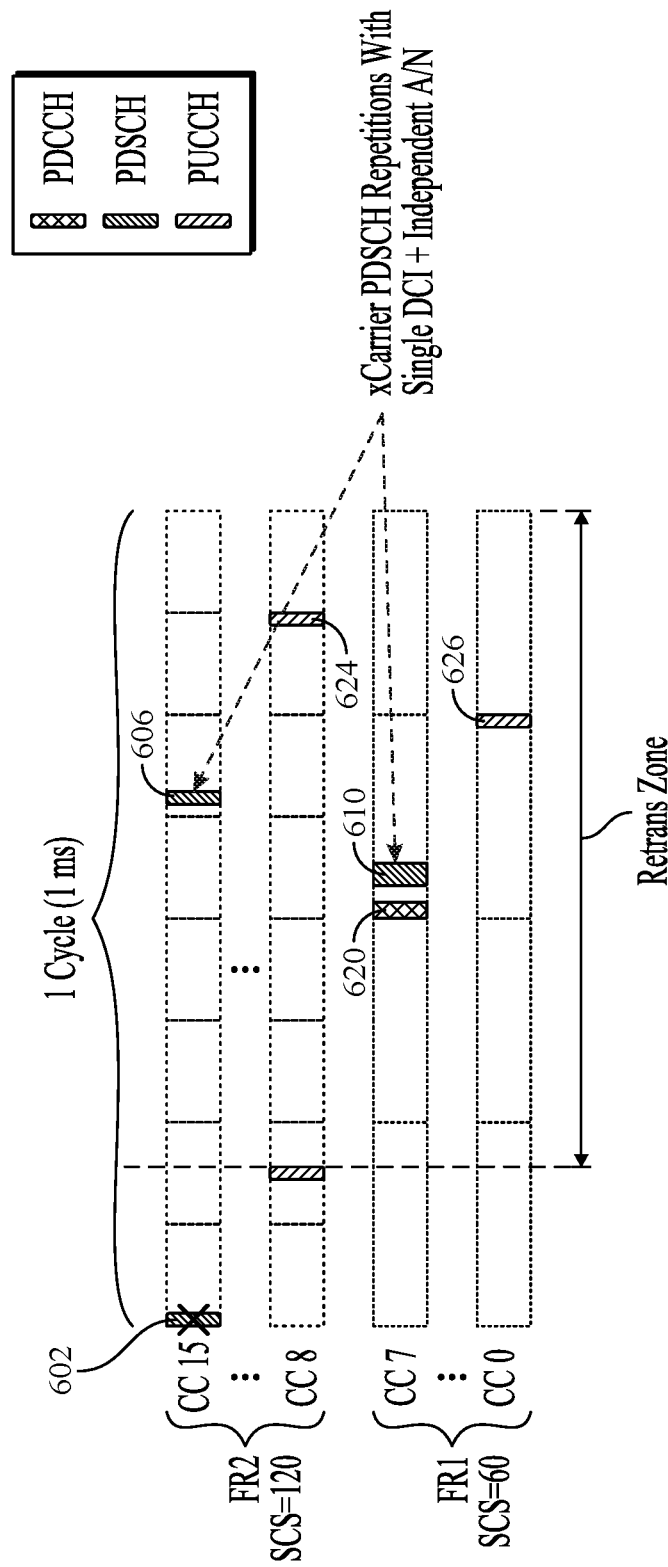
FIGS. 10A, 10B, and 10C illustrate cross-carrier data repetitions implemented with a single control message and independent A/N messages, in accordance with certain aspects of the present disclosure.
Figure 10B:
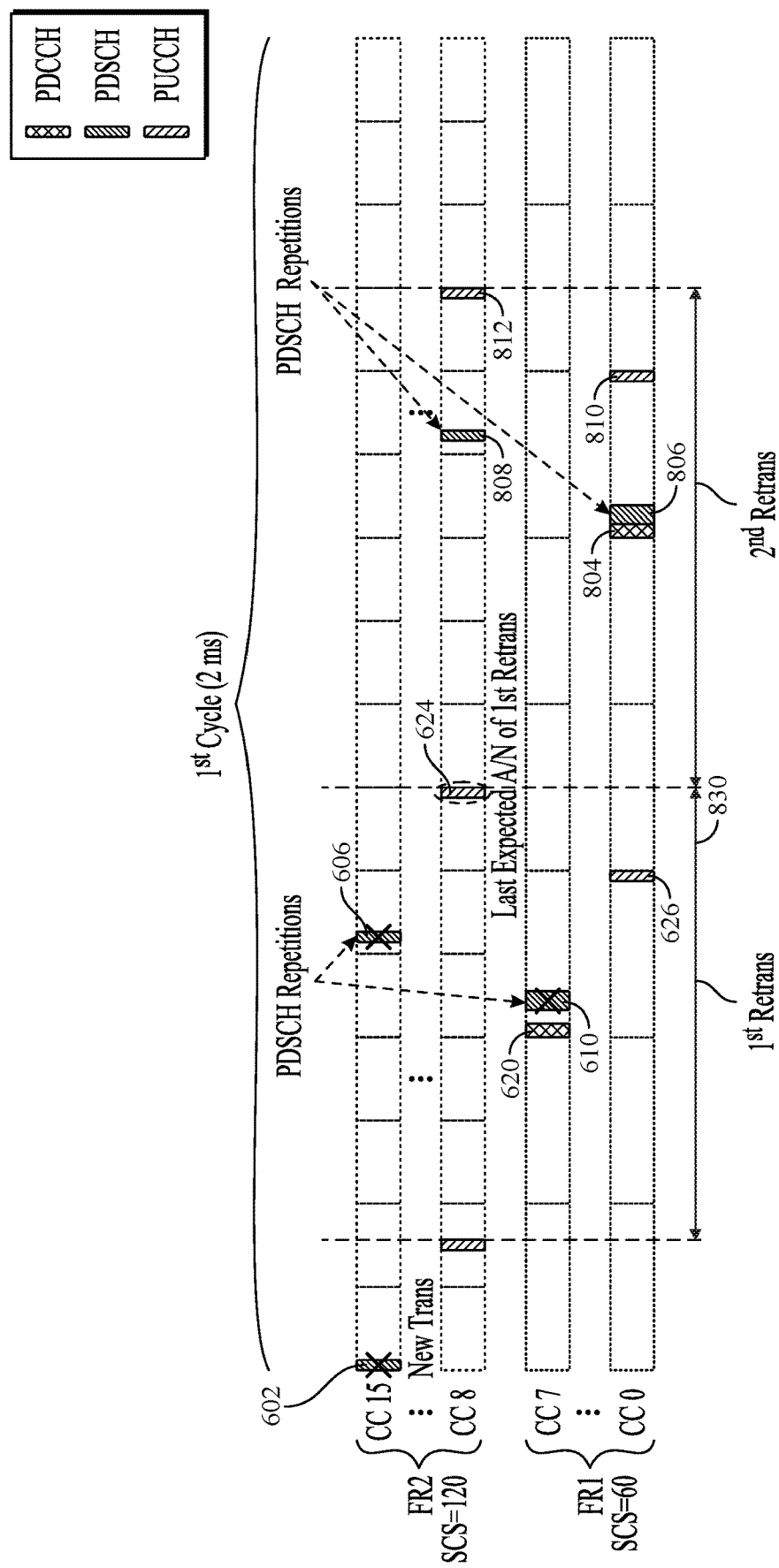
Figure 10C:
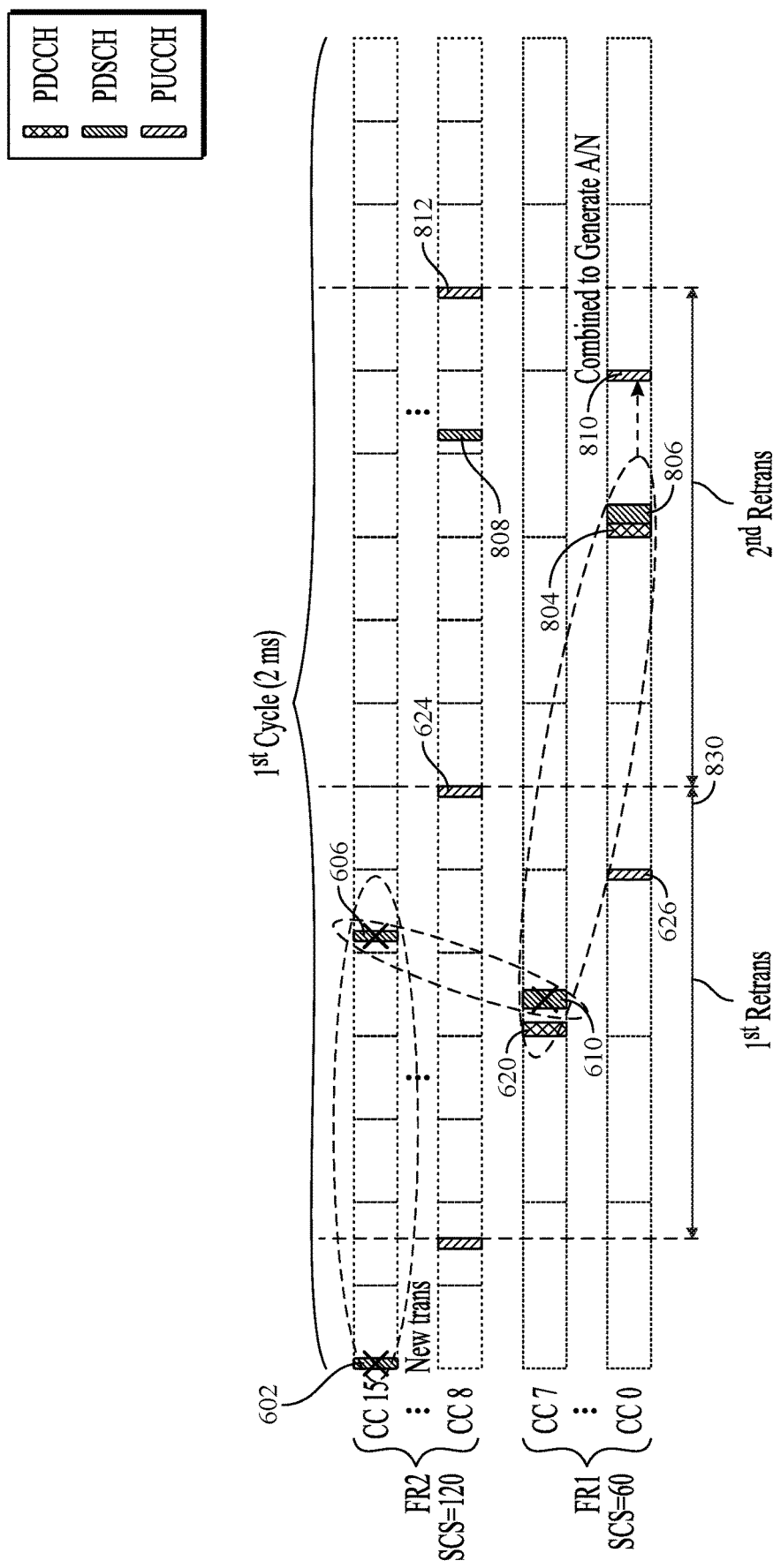

FIGS. 10A, 10B, and 10C illustrate cross-carrier data repetitions implemented with a single DCI and independent A/N messages, in accordance with certain aspects of the present disclosure. As illustrated, PDSCH repetitions (e.g., data repetitions 606, 610) may be scheduled by a single DCI (e.g., carried in control message 620 (e.g., PDCCH)), and are associated with their own respective A/N messages carried in control messages 624, 626 (e.g., PUCCHs) configured for the respective PDSCH receiving cell. In other words, the A/N message in control message 624 (e.g., PUCCH) indicates whether the data repetition 606 is decoded successfully at the UE, and the A/N message in control message 626 (e.g., PUCCH) indicates whether the data repetition 610 is decoded successfully at the UE. Retransmission (e.g., repetition) is considered successful as long as one repetition goes through (e.g., is successfully decoded). The single DCI in control message 620 (PDCCH) may indicate the allocation per PDSCH, or a pre-configured repetition allocation index, as described herein. The cell for transmitting PUCCH may be the same or different for different PDSCH receiving cells, depending on the configuration, as described herein.

As illustrated, in FIG. 10B, the BS 110 may transmit a single DCI during each retransmission occasion carried in control message 620 (e.g., PDCCH) and control message 804 (e.g., PDCCH) to schedule the data repetitions of their respective retransmission occasions. For same the HARQ-anchoring cell ID and HARQ process ID, the BS 110 retransmits PDSCH repetitions if no ACK (e.g., in control message 624 (PUCCH)) is received before the end of the last expected A/N transmission occasion for the previous PDSCH repetitions. The BS may schedule new transmissions after receiving the earliest A/N message (e.g., ACK) across all repetitions (e.g., the ACK carried in control message 810 (PUCCH)). As illustrated in FIG. 10C, the UE may attempt to decode individual PDSCH repetitions by combining the LLR stored from previous transmissions for the same TB/CBG indicated in a corresponding DCI, as described herein. The A/N messages carried in control messages 810, 812 (PUCCHs) are generated based on individual repetition decoding results of respective data repetitions 806, 808.

Figure 11A:
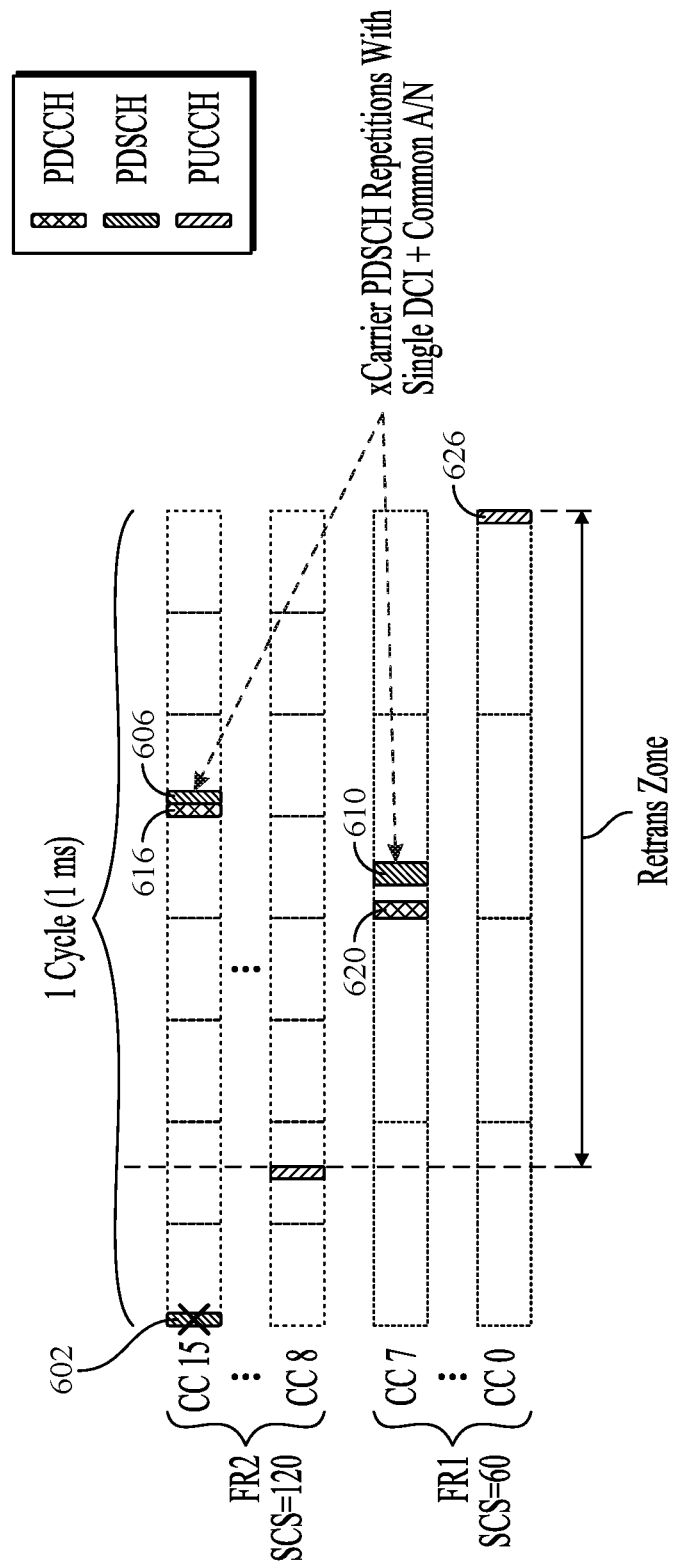
FIGS. 11A, 11B, and 11C illustrate cross-carrier data repetitions implemented with a multiple control messages and a common A/N message, in accordance with certain aspects of the present disclosure.
Figure 11B:
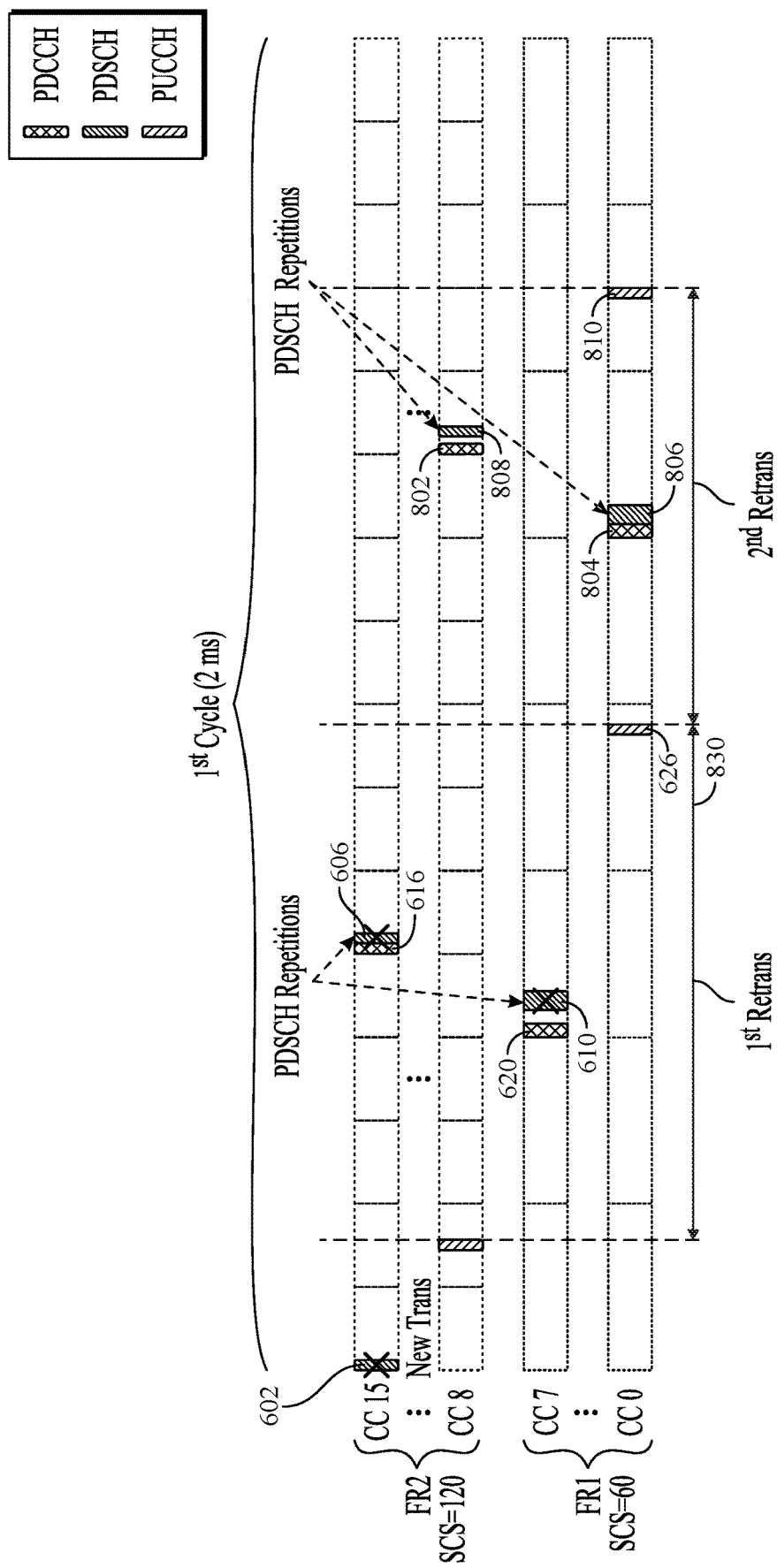
Figure 11C:
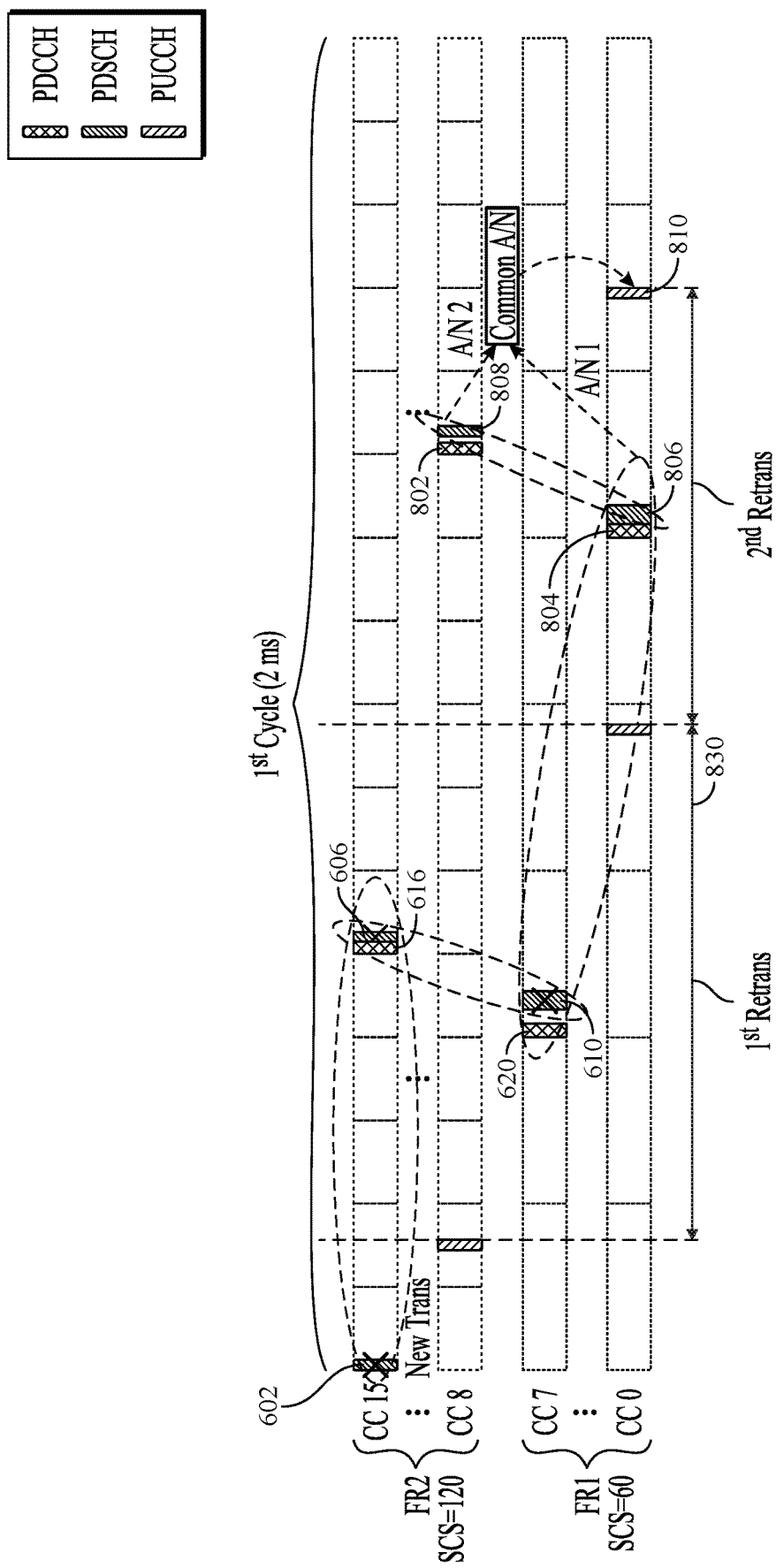

FIGS. 11A, 11B, and 11C illustrate cross-carrier data repetitions implemented with multiple DCIs and a common A/N message, in accordance with certain aspects of the present disclosure. Each PDSCH repetition may be scheduled by an individual DCI (e.g., carried in control messages 616, 620 (PDCCHs)), which may be on the same CC as the corresponding repetition. The data repetitions 606, 610 may be associated with common A/N bits carried by a single control message 626 (PUCCH) configured for one of the PDSCH repetition receiving cells (e.g., the cell (CC0) with smallest SCS). The location of the A/N bits in the codebook may be based on one of the PDSCH repetition occasions (e.g., the last one, such as the PDSCH repetition (e.g., data repetition 606)). Alternatively, the PDSCH repetition occasion determining the location of A/N bits may be signaled in every DCI (e.g., in control messages 616, 620 (PDCCHs)) to avoid DCI misdetection. For instance, DCI in control message 620 (e.g., PDCCH) may indicate to use the PDSCH repetition (e.g., data repetition 610) to determine the location of the A/N bits of the control message 626 (e.g., PUCCH).

As illustrated in FIG. 11B, for the same HARQ-anchoring cell ID and HARQ process ID, the BS 110 retransmits PDSCH repetitions if no ACK is received on the only expected A/N transmission occasion for the previous PDSCH repetitions, as described herein. The time between each PDSCH repetition and PUCCH should be at least N1 (e.g., minimum time gap) for SCS of the repetition receiving cell.

As illustrated in FIG. 11C, the UE attempts to decode individual PDSCH repetitions by combining LLR stored from previous transmissions for the same TB/CBG indicated in corresponding DCIs. Each of the data repetitions may be allocated their own A/N messages. After determining the A/N for all data repetitions with detected DCIs, a common A/N is computed and sent via the single control message 810 (PUCCH). The common A/N may be ACK if at least one of the data repetitions is successfully decoded, and otherwise, the common A/N is a negative acknowledgement (NACK).

Certain aspects of the present disclosure are directed to cross-carrier physical uplink shared channel (PUSCH) repetitions (e.g., uplink data repetitions). For example, once an initial PUSCH transmission fails, repetitions of the PUSCH may be configured via single or multiple PDCCHs, as described in more detail herein.

Figure 12:
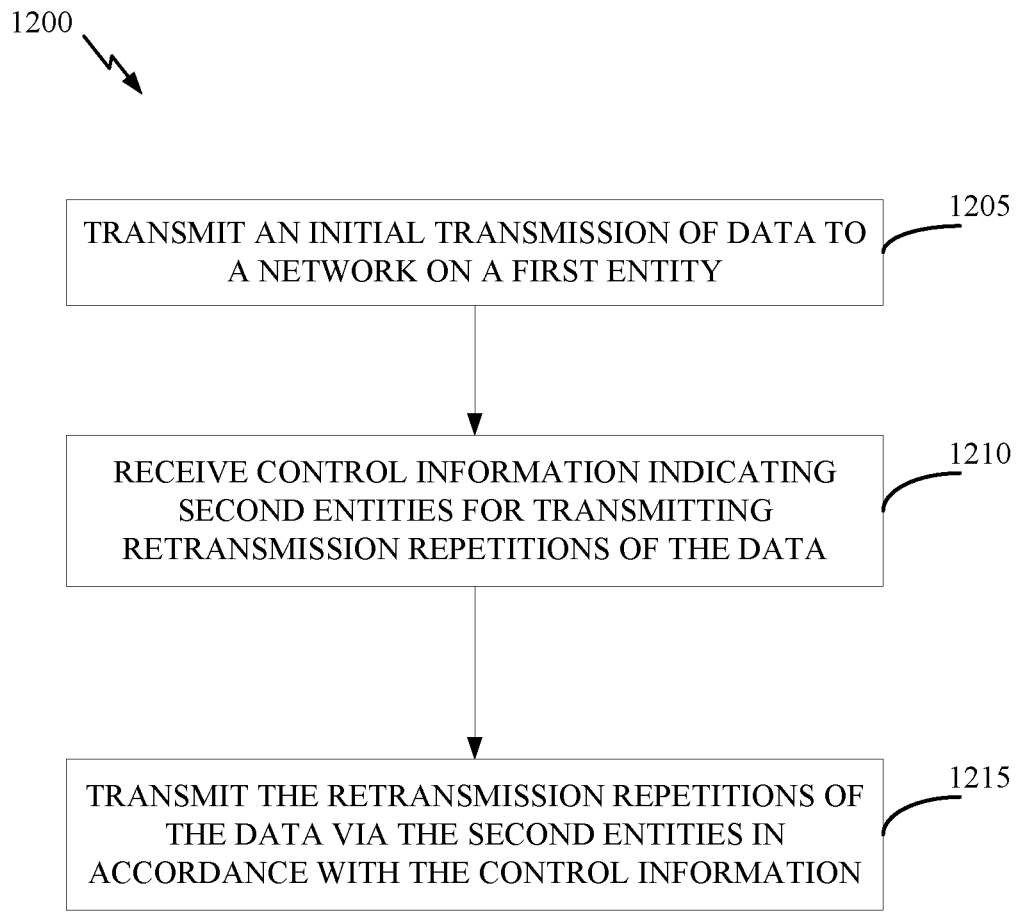
FIG. 12 is a flow diagram illustrating example operations for wireless communication by a UE, in accordance with certain aspects of the present disclosure.

FIG. 12 is a flow diagram illustrating example operations 1200 for wireless communication, in accordance with certain aspects of the present disclosure. The operations 1200 may be performed, for example, by a UE (e.g., such as a UE 120a in the wireless communication network 100).

Operations 1200 may be implemented as software components that are executed and run on one or more processors (e.g., controller/processor 1980 of FIG. 17). Further, the transmission and reception of signals by the UE in operations 1200 may be enabled, for example, by one or more antennas (e.g., antennas 1952 of FIG. 17). In certain aspects, the transmission and/or reception of signals by the UE may be implemented via a bus interface of one or more processors (e.g., controller/processor 1980) obtaining and/or outputting signals.

The operations 1200 may begin at block 1205, by the UE transmitting an initial transmission of data to a network on a first entity, and at block 1210, by receiving control information indicating second entities for transmitting retransmission repetitions of the data. At block 1215, the UE may transmit the retransmission repetitions of the data via the second entities in accordance with the control information. In certain aspects, one or more of the second entities are different than the first entity.

In certain aspects, the control information may be received via separate control messages, each of the control messages being received prior to a respective one of the retransmission repetitions of the data. For example, each of the control messages may indicate the second entities for transmitting the retransmission repetitions. In some cases, the control messages may be correlated. For example, at least one of the control messages may indicate resources allocated for receiving another one of the control messages. In certain aspects, each of the control messages indicates a respective one of the second entities.

In some cases, the control information is received via a single control message indicating the second entities for transmitting the retransmission repetitions of the data. In this case, the control information may include a retransmission allocation index indicating the second entities for transmitting the retransmission repetitions of the data.

In certain aspects, the initial transmission of the data is transmitted during a transmission occasion, and the retransmission repetitions of the data are transmitted during a retransmission time window if the data is unsuccessfully decoded during the transmission occasion. In certain aspects, the control information may include a HARQ process ID indicating the initial transmission of the data corresponding to the retransmission repetitions, and a HARQ anchoring entity ID associated with the first entity, as described herein. In certain aspects, the retransmission repetitions of the data may include repetitions of the data or include different redundancy versions of the data. In some cases, the first entity may be part of a first FR, and one or more of the second entities may be part of a second FR, the second FR having a lower SCS than the first FR. In some cases, the retransmission repetitions of the data may include the same group ID. In some cases, the initial transmission is configured using a CG.

Figure 13:
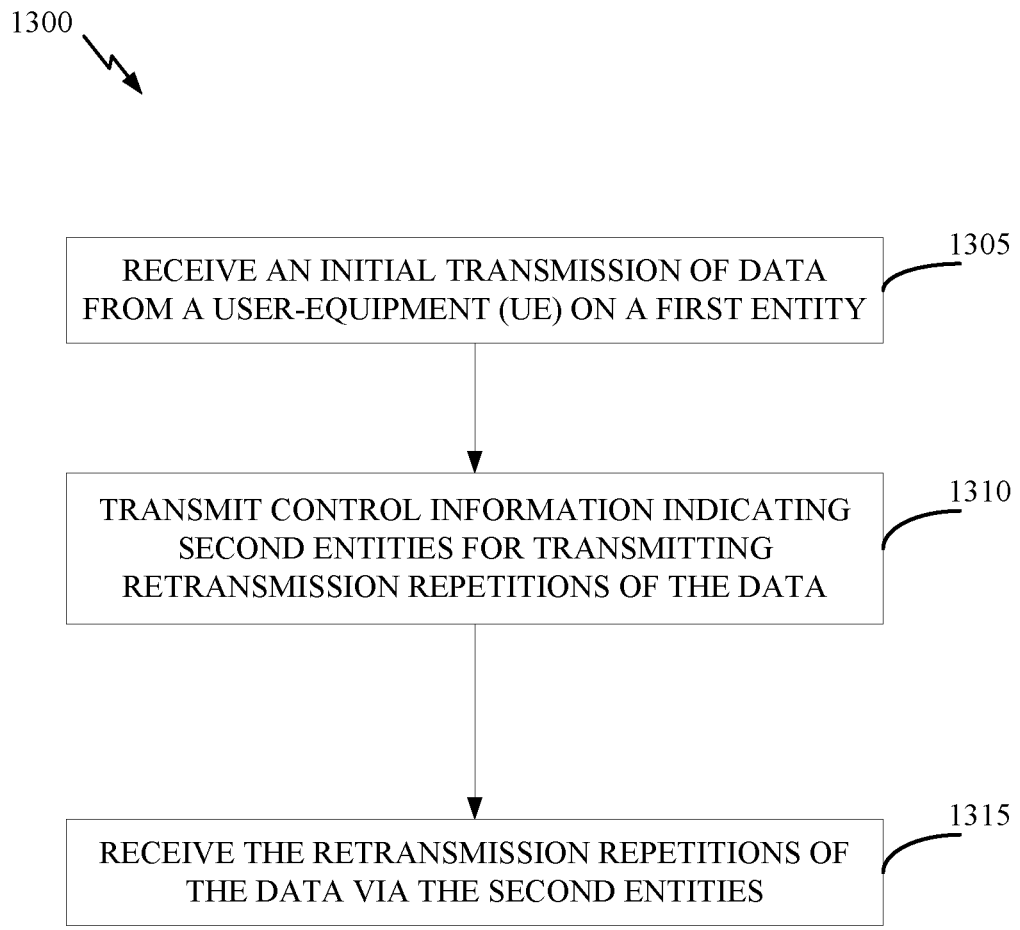
FIG. 13 is a flow diagram illustrating example operations for wireless communication by a BS, in accordance with certain aspects of the present disclosure.

FIG. 13 is a flow diagram illustrating example operations 1300 for wireless communication, in accordance with certain aspects of the present disclosure. The operations 1300 may be performed, for example, by a BS (e.g., such as the BS 110a in the wireless communication network 100). The operations 500 may be complimentary operations by the BS to the operations 1200 performed by the UE.

Operations 1300 may be implemented as software components that are executed and run on one or more processors (e.g., controller/processor 1940 of FIG. 17). Further, the transmission and reception of signals by the BS in operations 1300 may be enabled, for example, by one or more antennas (e.g., antennas 1934 of FIG. 17). In certain aspects, the transmission and/or reception of signals by the BS may be implemented via a bus interface of one or more processors (e.g., controller/processor 1940) obtaining and/or outputting signals.

The operations 1300 may begin at block 1305, by the BS receiving an initial transmission of data from a UE on a first entity, and at block 1310, transmitting control information indicating second entities for transmitting retransmission repetitions of the data. At block 1315, the BS may receive the retransmission repetitions of the data via the second entities.

Figure 14:
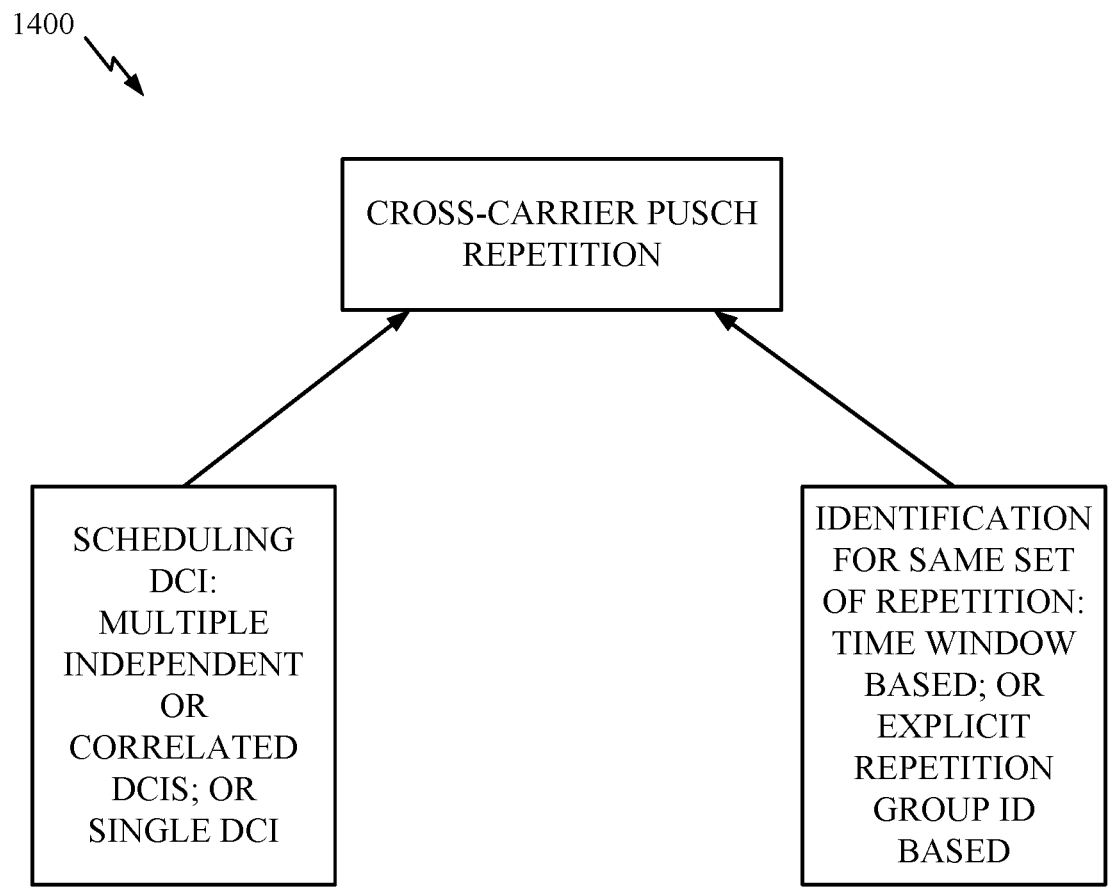
FIG. 14 illustrates various signaling aspects that may be implemented for cross-carrier data repetition, in accordance with certain aspects of the present disclosure.

FIG. 14 illustrates various signaling aspects 1400 that may be implemented for cross-carrier PUSCH repetition, in accordance with certain aspects of the present disclosure. As illustrated, cross-carrier PUSCH repetition may be implemented with multiple variants depending on signaling choices, including scheduling DCI, and identification for same set of repetition. For example, repetitions may be scheduled by a single DCI or multiple DCIs with independent or correlated scheduling information. Repetitions with the same payload may be identified by an explicit repetition group ID or by a certain time window. The various signaling aspects are described in more detail herein.

Figure 15A:
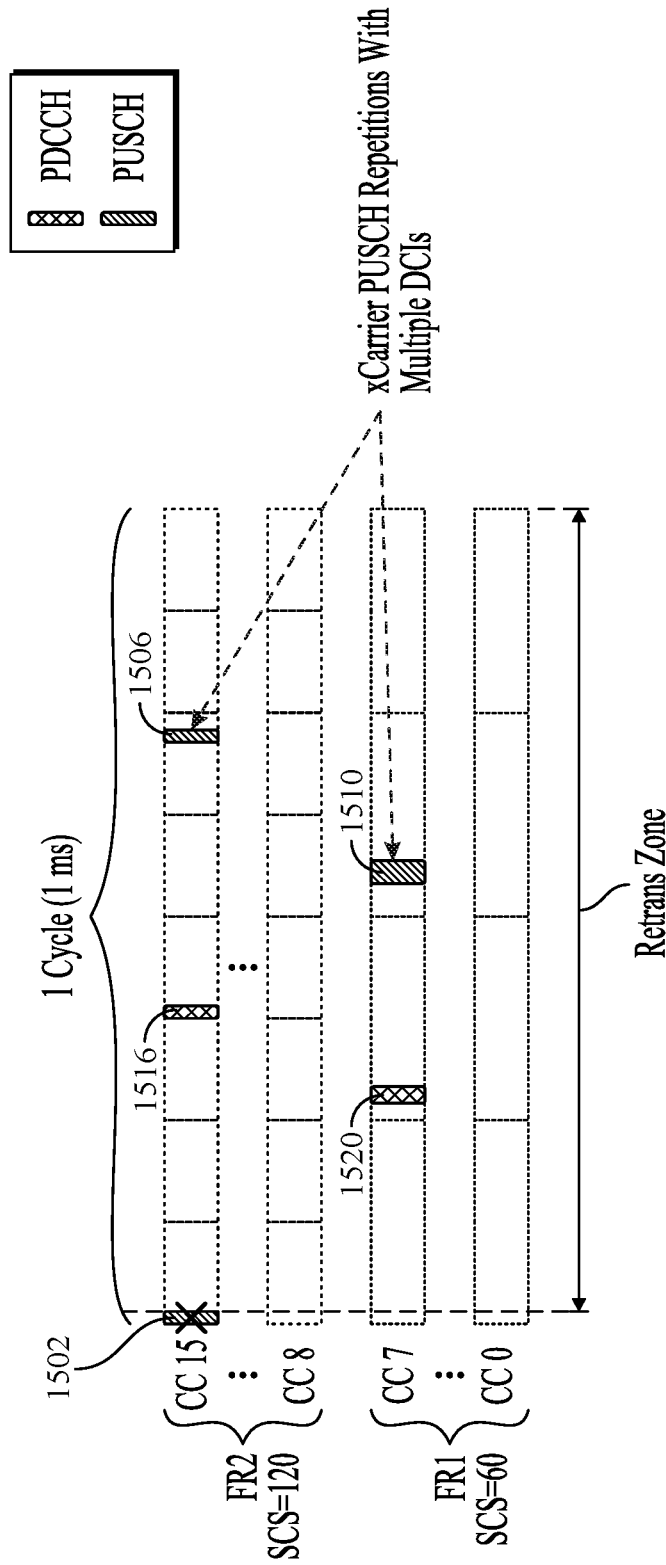
FIGS. 15A and 15B illustrate cross-carrier uplink data repetitions implemented with multiple downlink control information (DCIs), in accordance with certain aspects of the present disclosure.
Figure 15B:
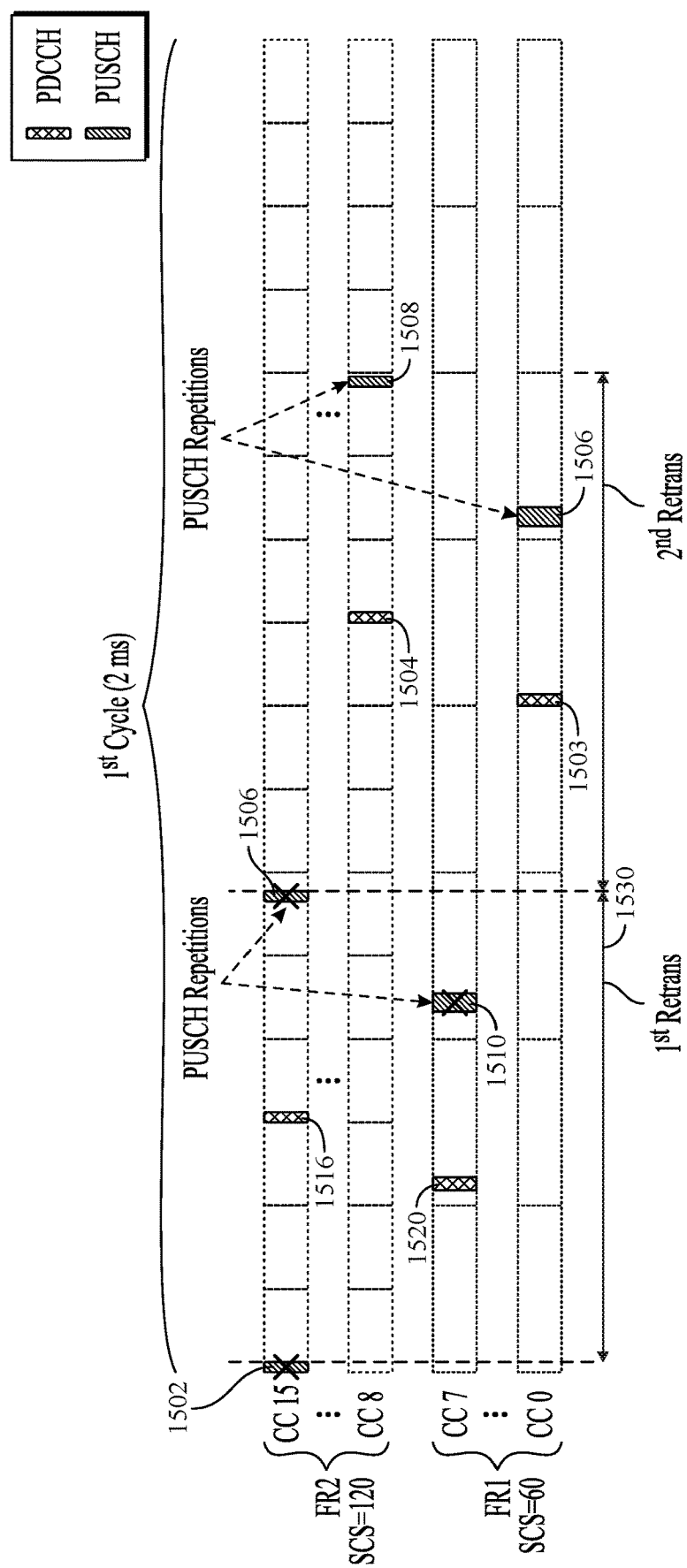

FIGS. 15A and 15B illustrate cross-carrier uplink data (PUSCH) repetitions implemented with multiple DCIs, in accordance with certain aspects of the present disclosure. To provide diversity for both data and control, each PUSCH repetition is scheduled by an individual DCI, which may be on the same CC as the corresponding PUSCH repetition. As illustrated in FIG. 15A, each of the data (PUSCH) repetitions 1506, 1510 of the initial data transmission 1502 may be scheduled using a corresponding control message 1516, 1520 (e.g., PDCCH), respectively. A retransmission may be considered as successful as long as one repetition is decoded by the BS 110 successfully. In certain aspects, to facilitate combining of the repetitions with at least a previous data transmission, each DCI may indicate a HARQ-anchoring cell ID and HARQ process ID. Each DCI may also indicate the same TB/CBG for UE to send over different repetitions. As illustrated in FIG. 15B, for the same HARQ-anchoring cell ID and HARQ process ID, the BS 110 retransmits data repetitions 1506, 1508 (PUSCHs) if no PUSCH is received correctly from the previous PUSCH repetition transmissions (e.g., repetitions in retransmission occasion 1530). For example, the BS 110 may schedule the data repetitions 1506, 1508 via respective DCIs carried in respective PDCCH 1503, 1504. The BS may schedule new transmissions after receiving the earliest PUSCH (e.g., data repetition 1506) across all repetitions, and the resources for the remaining one or more repetitions (e.g., data repetition 1508) may be canceled/reassigned for other traffic/UEs.

Figure 16A:
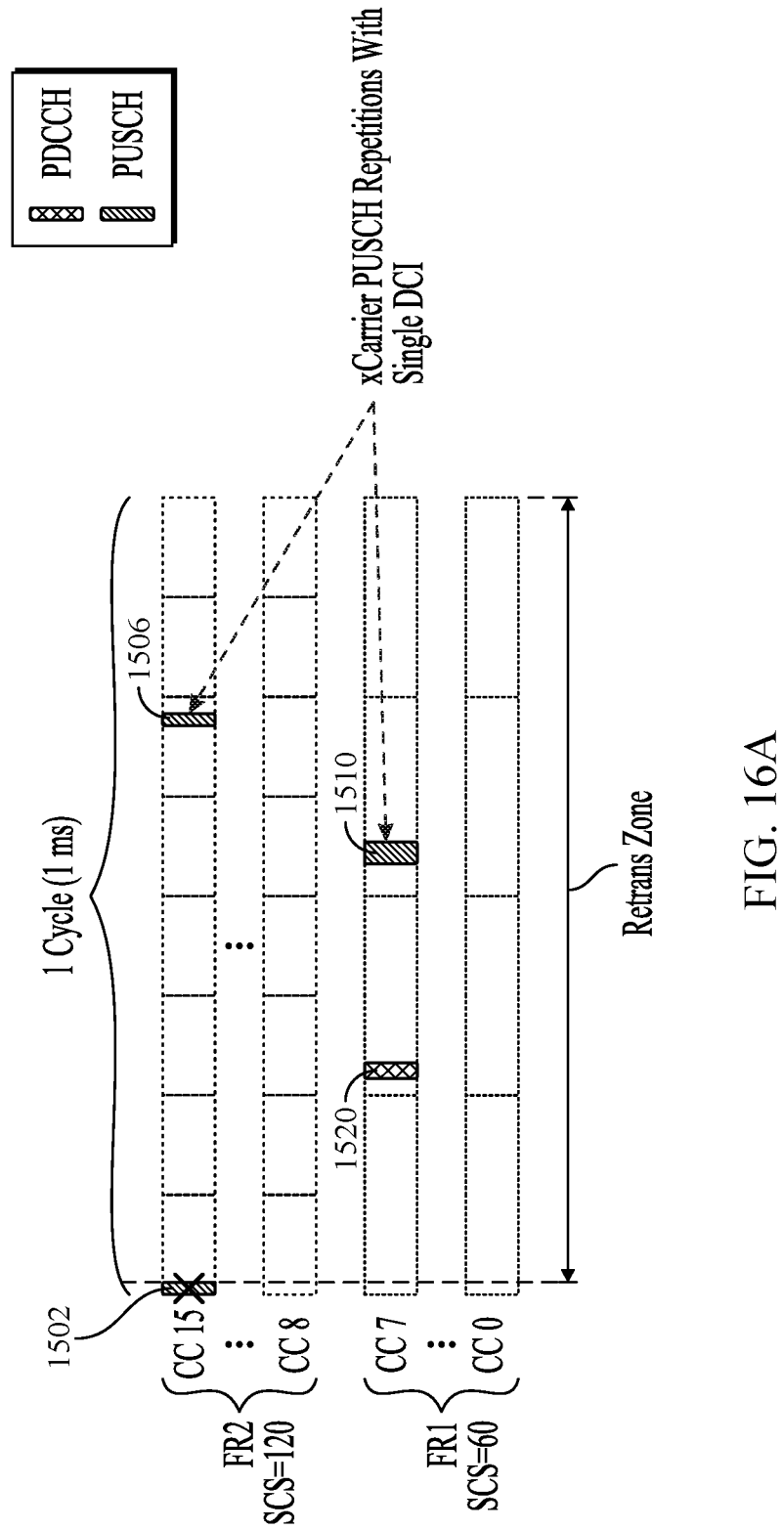
FIGS. 16A and 16B illustrate cross-carrier uplink data repetitions implemented with a single control message for scheduling repetitions in each repetition occasion, in accordance with certain aspects of the present disclosure.
Figure 16B:
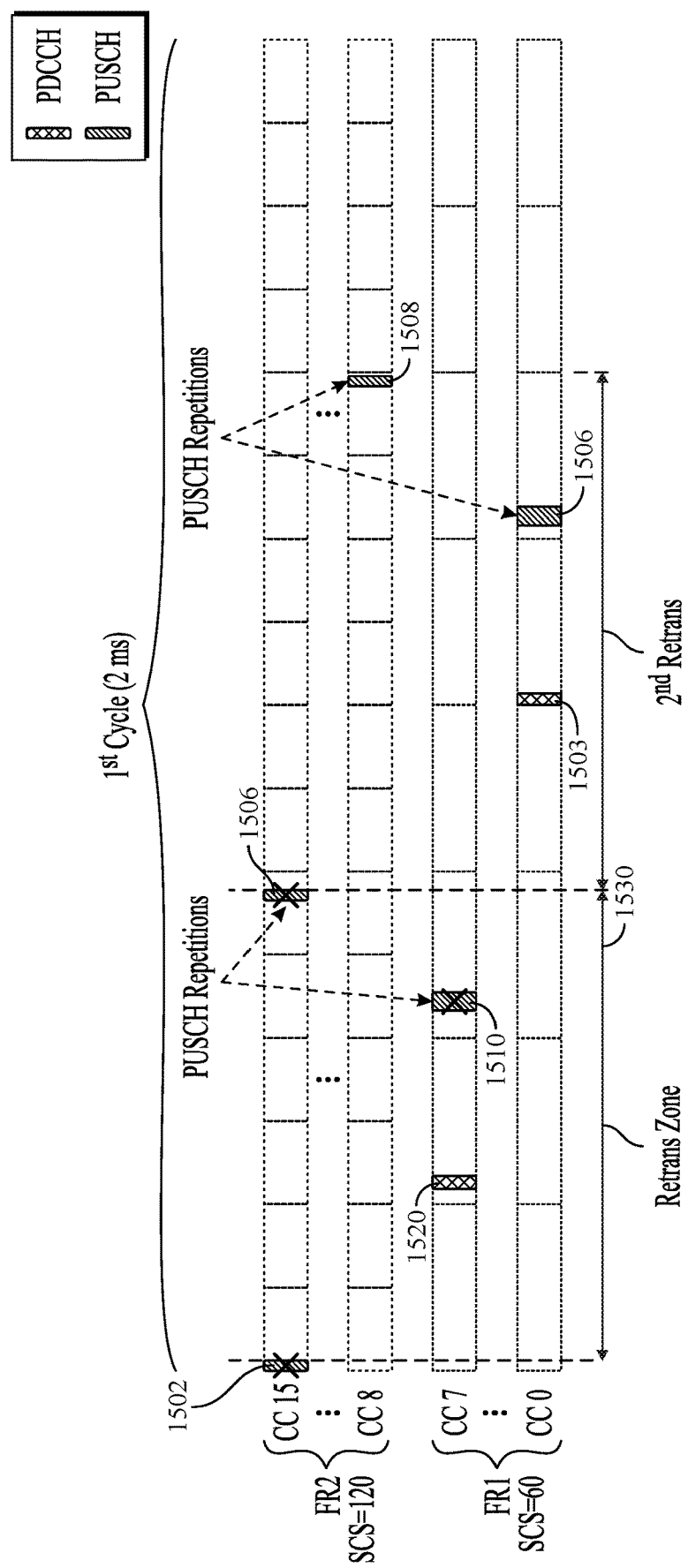

FIGS. 16A and 16B illustrate cross-carrier uplink data (e.g., PUSCH) repetitions implemented with a single DCI for scheduling repetitions in each repetition occasion, in accordance with certain aspects of the present disclosure. As illustrated, all data (PUSCH) repetitions 1506, 1510 are scheduled by a single DCI carried in control message 1520 (PDCCH) in retransmission occasion 1530. The single DCI indicates allocation per PUSCH repetition, or a pre-configured repetition allocation index, as described herein. As illustrated in FIG. 16B, for the same HARQ-anchoring cell ID and HARQ process ID, the BS 110 may receive PUSCH repetitions if no PUSCH is decoded successfully in previous PUSCH repetitions (e.g., in retransmission occasion 1530). The BS 110 may schedule new transmissions after receiving the earliest PUSCH repetition (e.g., data repetition 1506) across all repetitions, and the resources for the remaining repetitions (e.g., data repetition 1508) may be canceled/reassigned for other traffic/UEs.

Example Aspects

In a first aspect, a method for wireless communication comprises: monitoring for an initial transmission of data from a network on a first entity; receiving control information indicating second entities for receiving retransmission repetitions of the data, wherein one or more of the second entities are different than the first entity; and receiving the retransmission repetitions of the data via the second entities.

In a second aspect, in combination with a first aspect, each of the first entity and the second entities is a frequency resource.

In a third aspect, in combination with one or more of the first aspect and the second aspect, each of the first entity and the second entities is a cell or a component carrier.

In a fourth aspect, in combination with one or more of the first aspect through the third aspect, the control information is received via separate control messages, each of the control messages being received prior to a respective one of the retransmission repetitions of the data.

In a fifth aspect, in combination with a fourth aspect, each of the control messages indicate the second entities for receiving the retransmission repetitions.

In a sixth aspect, in combination with a fifth aspect, at least one of the control messages indicates resources allocated for receiving another one of the control messages.

In a seventh aspect, in combination with one or more of the fourth aspect through the sixth aspect, each of the control messages indicates a respective one of the second entities.

In an eighth aspect, in combination with one or more of the first aspect through the seventh aspect, the control information is received via a single control message indicating the second entities for receiving the retransmission repetitions of the data.

In a ninth aspect, in combination with the eighth aspect, the control information comprises a retransmission allocation index indicating the second entities for receiving the retransmission repetitions of the data.

In a tenth aspect, in combination with one or more of the first aspect through the ninth aspect, the retransmission repetitions of the data comprises a first retransmission repetition of the data and a second retransmission repetition of the data, the method further comprising: decoding the first retransmission repetition by combining the first retransmission repetition of the data and the initial transmission of the data; generating a first A/N message indicating whether the decoding of the first retransmission repetition of the data was successful; decoding the second retransmission repetition by combining the first retransmission repetition of the data, the second retransmission repetition of the data, and the initial transmission of the data; generating a second A/N message indicating whether the decoding of the second retransmission repetition of the data was successful; and transmitting the first A/N message and the second A/N message to the network.

In an eleventh aspect, in combination with the tenth aspect, the first A/N message is carried in a first A/N codebook, and bit locations of the first A/N message in the first A/N codebook correspond to one of the second entities associated with the first retransmission repetition, and wherein the second A/N message is carried in a second A/N codebook, and bit locations of the second A/N message in the second A/N codebook correspond to another one of the second entities associated with the second retransmission repetition.

In a twelfth aspect, in combination with the eleventh aspect, the first and second A/N messages are carried by different uplink (UL) A/N feedback resources, wherein each of the different UL A/N feedback resources is configured for each of the first and second entities for receiving each of the retransmission repetitions.

In a thirteenth aspect, in combination with one or more of the eleventh aspect and the twelfth aspect, the first and second A/N messages are carried by the same UL A/N feedback resources, wherein the same UL A/N feedback resources is configured for one or more of the first and second entities receiving retransmission repetitions.

In a fourteenth aspect, in combination with one or more of the first aspect through the thirteenth aspect, the retransmission repetitions of the data comprises a first retransmission repetition of the data and a second retransmission repetition of the data, the method further comprising: decoding the retransmission repetitions by combining the first retransmission repetition of the data, the second retransmission repetition of the data, and the initial transmission of the data; generating an A/N message indicating whether the decoding of the retransmission repetitions of the data was successful; and transmitting the A/N message to the network.

In a fifteenth aspect, in combination with the fourteenth aspect, the A/N message is carried in an A/N codebook, and bit locations of the A/N message in the A/N codebook is determined based on one of the second entities for the retransmission repetitions of the data.

In a sixteenth aspect, in combination with a fifteenth aspect, the control information indicates the one of the second entities based on which resources for transmission of the A/N message is determined.

In a seventeenth aspect, in combination with one or more of the fifteenth aspect and the sixteenth aspect, the A/N message is carried by different UL A/N feedback resources, and wherein each of the different UL A/N feedback resources is configured for each of the first and second entities for receiving each of the retransmission repetitions.

In an eighteenth aspect, in combination with one or more of the fifteenth aspect through the seventeenth aspect, the A/N message is carried by different UL A/N feedback resources, and wherein each of the different wherein the A/N message is carried by the same UL A/N feedback resource, and wherein the same UL A/N feedback resource is configured for one or more of the first and second entities for receiving retransmission repetitions.

In a nineteenth aspect, in combination with one or more of the first aspect through the eighteenth aspect, the initial transmission of the data is monitored for during a transmission occasion, and wherein the retransmission repetitions of the data are monitored for during a retransmission time window if the data is not successfully decoded during the transmission occasion.

In a twentieth aspect, in combination with one or more of the first aspect through the nineteenth aspect, wherein the control information comprises a hybrid automatic repeat request (HARQ) process identifier (ID) indicating the initial transmission of the data corresponding to the retransmission repetitions, and wherein the control information further comprises a HARQ anchoring entity ID associated with the first entity.

In a twenty-first aspect, in combination with one or more of the first aspect through the twentieth aspect, the retransmission repetitions of the data comprise repetitions of the data.

In a twenty-second aspect, in combination with one or more of the first aspect through the twenty-first aspect, the retransmission repetitions of the data comprise retransmission repetitions of different redundancy versions of the data.

In a twenty-third aspect, in combination with one or more of the first aspect through the twenty-second aspect, the first entity is part of a first frequency range (FR), and the one or more of the second entities is part of a second FR, the second FR having a lower subcarrier spacing (SCS) than the first FR.

In a twenty-fourth aspect, in combination with one or more of the first aspect through the twenty-third aspect, the retransmission repetitions of the data comprise the same group ID.

In a twenty-fifth aspect, in combination with one or more of the first aspect through the twenty-fourth aspect, the initial transmission is configured using semi-persistent scheduling (SPS).

In a twenty-sixth aspect, a method for wireless communication comprises: transmitting an initial transmission of data to a user-equipment (UE) on a first entity; transmitting control information indicating second entities for receiving retransmission repetitions of the data, wherein one or more of the second entities are different than the first entity; and transmitting the retransmission repetitions of the data via the second entities.

In a twenty-seventh aspect, in combination with the twenty-sixth aspect, each of the first entity and the second entity is a frequency resource.

In a twenty-eighth aspect, in combination with one or more of the twenty-sixth aspect and the twenty-seventh aspect, each of the first entity and the second entity is a cell or a component carrier.

In a twenty-ninth aspect, in combination with one or more of the twenty-sixth aspect through the twenty-eighth aspect, the control information is transmitted via separate control messages, each of the control messages being transmitted prior to a respective one of the retransmission repetitions of the data.

In a thirtieth aspect, in combination with the twenty-ninth aspect, each of the control messages indicate the second entities for receiving the retransmission repetitions.

In a thirty-first aspect, in combination with the thirtieth aspect, at least one of the control messages indicates resources allocated for transmitting another one of the control messages.

In a thirty-second aspect, in combination with one or more of the twenty-ninth aspect through the thirty-first aspect, each of the control messages indicates a respective one of the second entities.

In a thirty-third aspect, in combination with one or more of the twenty-sixth aspect through the thirty-second aspect, the control information is transmitted via a single control message indicating the second entities for receiving the retransmission repetitions of the data.

In a thirty-fourth aspect, in combination with the thirty-third aspect, the control information comprises a retransmission allocation index indicating the second entities for receiving the retransmission repetitions of the data.

In a thirty-fifth aspect, in combination with one or more of the twenty-sixth aspect through the thirty-fourth aspect, the retransmission repetitions of the data comprises a first retransmission repetition of the data and a second retransmission repetition of the data, the method further comprising: receiving a first acknowledgment/negative acknowledgement (A/N) message indicating whether decoding of the first retransmission repetition of the data was successful; and receiving a second A/N message indicating whether decoding of the second retransmission repetition of the data was successful.

In a thirty-sixth aspect, in combination with the thirty-fifth aspect, the first A/N message is carried in a first A/N codebook, and bit locations of the first A/N message in the first A/N codebook correspond to one of the second entities associated with the first retransmission repetition, and wherein the second A/N message is carried in a second A/N codebook, and bit locations of the second A/N message in the second A/N codebook correspond to another one of the second entities associated with the second retransmission repetition.

In a thirty-seventh aspect, in combination with the thirty-sixth aspect, the first and second A/N messages are carried by different uplink (UL) A/N feedback resources, wherein each of the different UL A/N feedback resources is configured for each of the first and second entities for transmitting each of the retransmission repetitions.

In a thirty-eighth aspect, in combination with one or more of the thirty-sixth aspect and the thirty-seventh aspect, the first and second A/N messages are carried by the same uplink (UL) A/N feedback resources, wherein the same UL A/N feedback resources is configured for one or more of the first and second entities for transmitting retransmission repetitions.

In a thirty-ninth aspect, in combination with one or more of the twenty-sixth aspect through the thirty-eighth aspect, the retransmission repetitions of the data comprises a first retransmission repetition of the data and a second retransmission repetition of the data, the method further comprising: receiving an A/N message indicating whether decoding of the retransmission repetitions of the data was successful.

In a fortieth aspect, in combination with the thirty-ninth aspect, the A/N message is carried in an A/N codebook, and bit locations of the A/N message in the A/N codebook is determined based on one of the second entities for the first retransmission repetition of the data and the second retransmission repetition of the data.

In a forty-first aspect, in combination with the fortieth aspect, the control information indicates the one of the second entities based on which resources for transmission of the A/N message is determined.

In a forty-second aspect, in combination with one or more of the fortieth aspect and the forty-first aspect, the A/N message is carried by different UL A/N feedback resources, wherein each of the different UL A/N feedback resources is configured for each of the first and second entities for transmitting each of the retransmission repetitions.

In a forty-third aspect, in combination with one or more of the fortieth aspect through the forty-second aspect, the A/N message is carried by the same UL A/N feedback resources, wherein the same UL A/N feedback resource is configured for one or more of the first and second entities for transmitting retransmission repetitions.

In a forty-fourth aspect, in combination with one or more of the twenty-sixth aspect through the forty-third aspect, the initial transmission of the data is transmitted during a transmission occasion, and wherein the retransmission repetitions of the data are transmitted during a retransmission time window if the data is not successfully decoded during the transmission occasion.

In a forty-fifth aspect, in combination with one or more of the twenty-sixth aspect through the forty-fourth aspect, the control information comprises a HARQ process ID indicating the initial transmission of the data corresponding to the retransmission repetitions, and wherein the control information further comprises an HARQ anchoring entity ID associated with the first entity.

In a forty-sixth aspect, in combination with one or more of the twenty-sixth aspect through the forty-fifth aspect, the retransmission repetitions of the data comprise repetitions of the data.

In a forty-seventh aspect, in combination with one or more of the twenty-sixth aspect through the forty-sixth aspect, the retransmission repetitions of the data comprise retransmission repetitions of different redundancy versions of the data.

In a forty-eighth aspect, in combination with one or more of the twenty-sixth aspect through the forty-seventh aspect, the first entity is part of a first FR, and one or more of the second entities is part of a second FR, the second FR having a lower SCS than the first FR.

In a forty-ninth aspect, in combination with one or more of the twenty-sixth aspect through the forty-eighth aspect, the retransmission repetitions of the data comprise the same group ID.

In a fiftieth aspect, in combination with one or more of the twenty-sixth aspect through the forty-ninth aspect, the initial transmission is configured using SPS.

In a fifty-first aspect, a method for wireless communication comprises: transmitting an initial transmission of data to a network on a first entity; receiving control information indicating second entities for transmitting retransmission repetitions of the data, wherein one or more of the second entities are different than the first entity; and transmitting the retransmission repetitions of the data via the second entities in accordance with the control information.

In a fifty-second aspect, in combination with a fifty-first aspect, each of the first entity and the second entity is a frequency resource.

In a fifty-third aspect, in combination with one or more of the fifty-first aspect and the fifty-second aspect, each of the first entity and the second entity is a cell or a component carrier.

In a fifty-fourth aspect, in combination with one or more of the fifty-first aspect through the fifty-third aspect, the control information is received via separate control messages, each of the control messages being received prior to a respective one of the retransmission repetitions of the data.

In a fifty-fifth aspect, in combination with the fifty-fourth aspect, each of the control messages indicate the second entities for transmitting the retransmission repetitions.

In a fifty-sixth aspect, in combination with the fifty-fifth aspect, at least one of the control messages indicates resources allocated for receiving another one of the control messages.

In a fifty-seventh aspect, in combination with one or more of the fifty-fourth aspect through the fifty-sixth aspect, each of the control messages indicates a respective one of the second entities.

In a fifty-eighth aspect, in combination with one or more of the fifty-first aspect through the fifty-seventh aspect, the control information is received via a single control message indicating the second entities for transmitting the retransmission repetitions of the data.

In a fifty-ninth aspect, in combination with the fifty-eighth aspect, the control information comprises a retransmission allocation index indicating the second entities for transmitting the retransmission repetitions of the data.

In a sixtieth aspect, in combination with one or more of the fifty-first aspect through the fifty-ninth aspect, the initial transmission of the data is transmitted during a transmission occasion, and wherein the retransmission repetitions of the data are transmitted during a retransmission time window if the data is unsuccessfully decoded during the transmission occasion.

In a sixty-first aspect, in combination with one or more of the fifty-first aspect through the sixtieth aspect, the control information comprises a HARQ process ID indicating the initial transmission of the data corresponding to the retransmission repetitions, and wherein the control information further comprises an HARQ anchoring entity ID associated with the first entity.

In a sixty-second aspect, in combination with one or more of the fifty-first aspect through the sixty-first aspect, the retransmission repetitions of the data comprise repetitions of the data.

In a sixty-third aspect, in combination with one or more of the fifty-first aspect through the sixty-second aspect, the retransmission repetitions of the data comprise retransmission repetitions of different redundancy versions of the data.

In a sixty-fourth aspect, in combination with one or more of the fifty-first aspect through the sixty-third aspect, the first entity is part of a first FR, and one or more of the second entities is part of a second FR, the second FR having a lower SCS than the first FR.

In a sixty-fifth aspect, in combination with one or more of the fifty-first aspect through the sixty-fourth aspect, the retransmission repetitions of the data comprise the same group ID.

In a sixty-sixth aspect, in combination with one or more of the fifty-first aspect through the sixty-fifth aspect, the initial transmission is configured using a configured grant (CG).

In sixty-seventh aspect, a method for wireless communication, comprising: receiving an initial transmission of data from a UE on a first entity; transmitting control information indicating second entities for transmitting retransmission repetitions of the data, wherein one or more of the second entities are different than the first entity; and receiving the retransmission repetitions of the data via the second entities.

In a sixty-eighth aspect, in combination with the sixty-seventh aspect, each of the first entity and the second entity is a frequency resource.

In a sixty-ninth aspect, in combination with one or more of the sixty-seventh aspect and the sixty-eighth aspect, each of the first entity and the second entity is a cell or a component carrier.

In a seventieth aspect, in combination with one or more of the sixty-seventh aspect through the sixty-ninth aspect, the control information is transmitted via separate control messages, each of the control messages being transmitted prior to a respective one of the retransmission repetitions of the data.

In a seventy-first aspect, in combination with seventieth aspect, each of the control messages indicate the second entities for transmitting the retransmission repetitions.

In a seventy-second aspect, in combination with one or more of the seventieth aspect and the seventy-first aspect, at least one of the control messages indicates resources allocated for transmitting another one of the control messages.

In a seventy-third aspect, in combination with one or more of the seventieth aspect through the seventy-second aspect, each of the control messages indicates a respective one of the second entities.

In a seventy-fourth aspect, in combination with one or more of the sixty-seventh aspect through the seventy-third aspect, the control information is transmitted via a single control message indicating the second entities for transmitting the retransmission repetitions of the data.

In a seventy-fifth aspect, in combination with the seventy-fourth aspect, the control information comprises a retransmission allocation index indicating the second entities for transmitting the retransmission repetitions of the data.

In a seventy-sixth aspect, in combination with one or more of the sixty-seventh aspect through the seventy-fifth aspect, the initial transmission of the data is received during a transmission occasion, and wherein the retransmission repetitions of the data are received during a retransmission time window if the data is not successfully decoded during the transmission occasion.

In a seventy-seventh aspect, in combination with one or more of the sixty-seventh aspect through the seventy-sixth aspect, the control information comprises a HARQ process ID indicating the initial transmission of the data corresponding to the retransmission repetitions, and wherein the control information further comprises an HARQ anchoring entity ID associated with the first entity.

In a seventy-eighth aspect, in combination with one or more of the sixty-seventh aspect through the seventy-seventh aspect, the retransmission repetitions of the data comprise repetitions of the data.

In a seventy-ninth aspect, in combination with one or more of the sixty-seventh aspect through the seventy-eighth aspect, the retransmission repetitions of the data comprise retransmission repetitions of different redundancy versions of the data.

In a eightieth aspect, in combination with one or more of the sixty-seventh aspect through the seventy-ninth aspect, the first entity is part of a first FR, and one or more of the second entities is part of a second FR, the second FR having a lower SCS than the first FR.

In a eighty-first aspect, in combination with one or more of the sixty-seventh aspect through the eightieth aspect, the retransmission repetitions of the data comprise the same group ID.

In a eighty-second aspect, in combination with one or more of the sixty-seventh aspect through the eighty-first aspect, the initial transmission is configured using SPS.

In an eighty-third aspect, an apparatus for wireless communication comprises: a memory; and one or more processors coupled to the memory, the one or more processors and the memory being configured to: monitor for an initial transmission of data from a network on a first entity; receive control information indicating second entities for receiving retransmission repetitions of the data, wherein one or more of the second entities are different than the first entity; and receive the retransmission repetitions of the data via the second entities.

In an eighty-fourth aspect, an apparatus for wireless communication comprises: means for monitoring for an initial transmission of data from a network on a first entity; means for receiving control information indicating second entities for receiving retransmission repetitions of the data, wherein one or more of the second entities are different than the first entity; and means for receiving the retransmission repetitions of the data via the second entities.

In an eighty-fifth aspect, a computer readable medium having computer executable code stored thereon for wireless communication comprises: code for monitoring for an initial transmission of data from a network on a first entity; code for receiving control information indicating second entities for receiving retransmission repetitions of the data, wherein one or more of the second entities are different than the first entity; and code for receiving the retransmission repetitions of the data via the second entities.

In an eighty-sixth aspect, an apparatus for wireless communication comprises: a memory; and one or more processors coupled to the memory, the one or more processors and the memory being configured to: transmit an initial transmission of data to a UE on a first entity; transmit control information indicating second entities for receiving retransmission repetitions of the data, wherein one or more of the second entities are different than the first entity; and transmit the retransmission repetitions of the data via the second entities.

In an eighty-seventh aspect, an apparatus for wireless communication comprises: means for transmitting an initial transmission of data to a UE on a first entity; means for transmitting control information indicating second entities for receiving retransmission repetitions of the data, wherein one or more of the second entities are different than the first entity; and means for transmitting the retransmission repetitions of the data via the second entities.

In an eighty-eighth aspect, a computer readable medium having computer executable code stored thereon for wireless communication comprises: code for transmitting an initial transmission of data to a UE on a first entity; code for transmitting control information indicating second entities for receiving retransmission repetitions of the data, wherein one or more of the second entities are different than the first entity; and code for transmitting the retransmission repetitions of the data via the second entities.

In an eighty-ninth aspect, an apparatus for wireless communication, comprises: a memory; and one or more processors coupled to the memory, the one or more processors and the memory being configured to: transmit an initial transmission of data to a network on a first entity; receive control information indicating second entities for transmitting retransmission repetitions of the data, wherein one or more of the second entities are different than the first entity; and transmit the retransmission repetitions of the data via the second entities in accordance with the control information.

In an ninetieth aspect, an apparatus for wireless communication comprises: means for transmitting an initial transmission of data to a network on a first entity; means for receiving control information indicating second entities for transmitting retransmission repetitions of the data, wherein one or more of the second entities are different than the first entity; and means for transmitting the retransmission repetitions of the data via the second entities in accordance with the control information.

In an ninety-first aspect, a computer readable medium having computer executable code stored thereon for wireless communication comprises: code for transmitting an initial transmission of data to a network on a first entity; code for receiving control information indicating second entities for transmitting retransmission repetitions of the data, wherein one or more of the second entities are different than the first entity; and code for transmitting the retransmission repetitions of the data via the second entities in accordance with the control information.

In an ninety-second aspect, an apparatus for wireless communication comprises: a memory; and one or more processors coupled to the memory, the one or more processors and the memory being configured to: receive an initial transmission of data from a UE on a first entity; transmit control information indicating second entities for transmitting retransmission repetitions of the data, wherein one or more of the second entities are different than the first entity; and receive the retransmission repetitions of the data via the second entities.

In an ninety-third aspect, an apparatus for wireless communication comprises: means for receiving an initial transmission of data from a UE on a first entity; means for transmitting control information indicating second entities for transmitting retransmission repetitions of the data, wherein one or more of the second entities are different than the first entity; and means for receiving the retransmission repetitions of the data via the second entities.

In an ninety-fourth aspect, a computer readable medium having computer executable code stored thereon for wireless communication comprises: code for receiving an initial transmission of data from a UE on a first entity; code for transmitting control information indicating second entities for transmitting retransmission repetitions of the data, wherein one or more of the second entities are different than the first entity; and code for receiving the retransmission repetitions of the data via the second entities.

In a ninety-fifth aspect, an apparatus for wireless communication includes a processor, memory coupled with the processor, the processor and memory configured to perform a method of any one of the first aspect to the eighty-second aspect.

In a ninety-sixth aspect, an apparatus for wireless communication includes at least one means for performing a method of any one of the first aspect to the eighty-second aspect.

In a ninety-seventh aspect, a non-transitory computer-readable medium storing code for wireless communication includes a processor, memory coupled with the processor, and instructions stored in the memory and executable by the processor to cause the apparatus to perform a method of any one of the first aspect to the eighty-second aspect.

FIG. 17 illustrates a communications device 1700 that may include various components (e.g., corresponding to means-plus-function components) configured to perform operations for the techniques disclosed herein, such as the operations illustrated in FIGS. 4 and 12. The communications device 1700 includes a processing system 1702 coupled to a transceiver 1708. The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations illustrated in FIGS. 4 and 12, or other operations for performing the various techniques discussed herein for cross-carrier repetition. In certain aspects, computer-readable medium/memory 1712 stores code 1714 for monitoring; code 1716 for receiving, code 1718 for decoding, code 1720 for generating, and code 1722 for transmitting. In certain aspects, the processor 1704 has circuitry configured to implement the code stored in the computer-readable medium/memory 1712. The processor 1704 includes circuitry 1724 for monitoring; circuitry 1726 for receiving, circuitry 1728 for decoding, circuitry 1730 for generating, and circuitry 1732 for transmitting.

Figure 18:
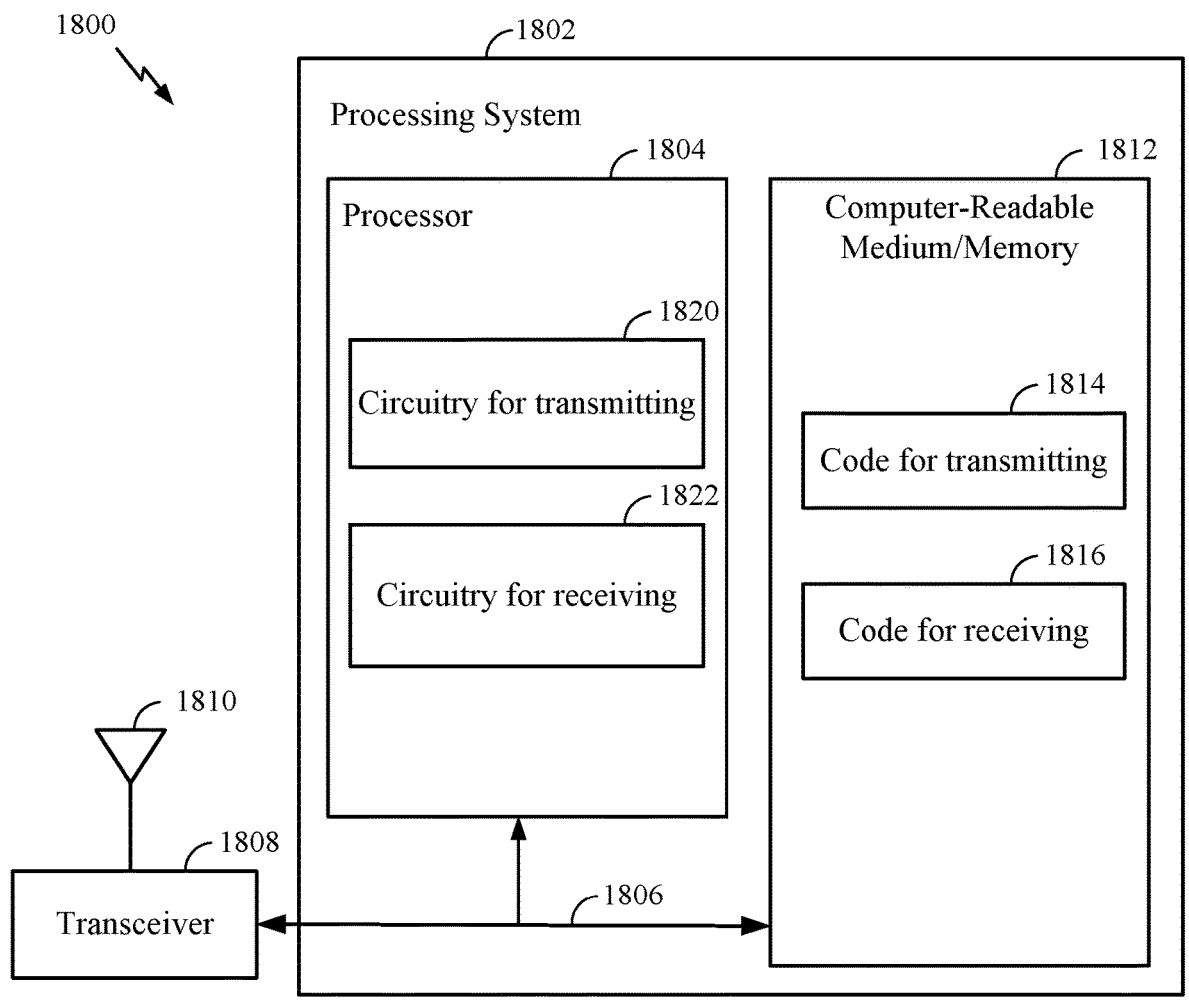
FIG. 18 illustrates a communications device that may include various components configured to perform operations for the techniques disclosed herein in accordance with aspects of the present disclosure.

FIG. 18 illustrates a communications device 1800 that may include various components (e.g., corresponding to means-plus-function components) configured to perform operations for the techniques disclosed herein, such as the operations illustrated in FIGS. 5 and 13. The communications device 1800 includes a processing system 1802 coupled to a transceiver 1808. The transceiver 1808 is configured to transmit and receive signals for the communications device 1800 via an antenna 1810, such as the various signals as described herein. The processing system 1802 may be configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/memory 1812 is configured to store instructions (e.g., computer-executable code) that when executed by the processor 1804, cause the processor 1804 to perform the operations illustrated in FIGS. 5 and 13, or other operations for performing the various techniques discussed herein for cross-carrier repetition. In certain aspects, computer-readable medium/memory 1812 stores code 1814 for transmitting; code 1816 for receiving. In certain aspects, the processor 1804 has circuitry configured to implement the code stored in the computer-readable medium/memory 1812. The processor 1804 includes circuitry 1820 for transmitting; circuitry 1822 for receiving.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Figure 19:
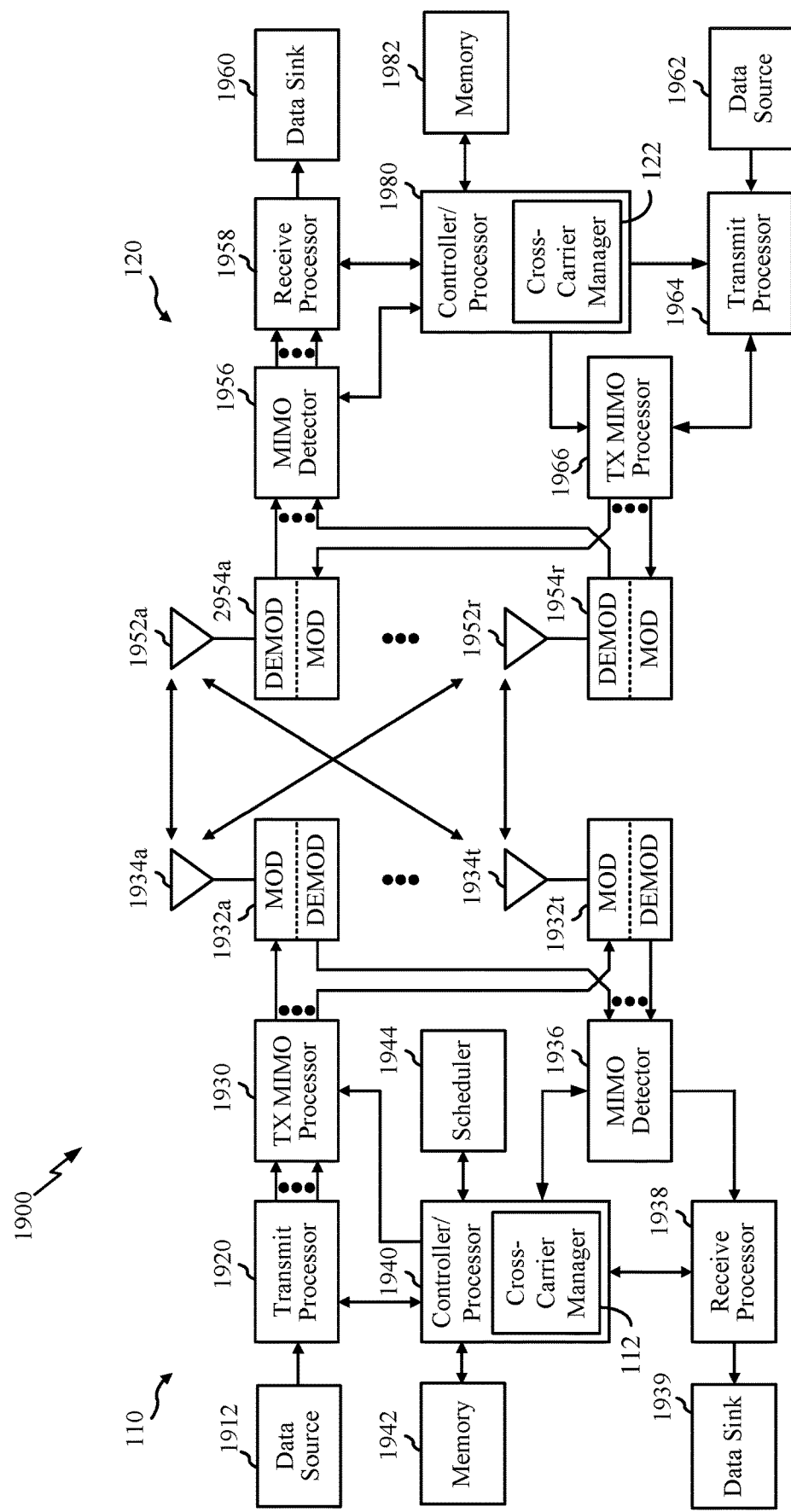
FIG. 19 is a block diagram conceptually illustrating a design of an example BS and UE, in accordance with certain aspects of the present disclosure.

FIG. 19 illustrates example components 1900 of BS 110a and UE 120a (e.g., in the wireless communication network 100 of FIG. 1), which may be used to implement aspects of the present disclosure.

At the BS 110a, a transmit processor 1920 may receive data from a data source 1912 and control information from a controller/processor 1940. The control information may be for the physical broadcast channel (PBCH), physical control format indicator channel (PCFICH), physical hybrid ARQ indicator channel (PHICH), PDCCH, group common PDCCH (GC PDCCH), etc. The data may be for the PDSCH, etc. The processor 1920 may process (e.g., encode and symbol map) the data and control information to obtain data symbols and control symbols, respectively. The transmit processor 1920 may also generate reference symbols, such as for the primary synchronization signal (PSS), secondary synchronization signal (SSS), and cell-specific reference signal (CRS). A transmit (TX) multiple-input multiple-output (MIMO) processor 1930 may perform spatial processing (e.g., precoding) on the data symbols, the control symbols, and/or the reference symbols, if applicable, and may provide output symbol streams to the modulators (MODs) 1932a-1932t. Each modulator 1932 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 1932a-1932t may be transmitted via the antennas 1934a-1934t, respectively.

At the UE 120a, the antennas 1952a-1952r may receive the downlink signals from the BS 110a and may provide received signals to the demodulators (DEMODs) in transceivers 1954a-1954r, respectively. Each demodulator 1954 may condition (e.g., filter, amplify, downconvert, and digitize) a respective received signal to obtain input samples. Each demodulator may further process the input samples (e.g., for OFDM, etc.) to obtain received symbols. A MIMO detector 1956 may obtain received symbols from all the demodulators 1954a-1954r, perform MIMO detection on the received symbols if applicable, and provide detected symbols. A receive processor 1958 may process (e.g., demodulate, deinterleave, and decode) the detected symbols, provide decoded data for the UE 120a to a data sink 1960, and provide decoded control information to a controller/processor 1980.

On the uplink, at UE 120a, a transmit processor 1964 may receive and process data (e.g., for the physical uplink shared channel (PUSCH)) from a data source 1962 and control information (e.g., for the physical uplink control channel (PUCCH)) from the controller/processor 1980. The transmit processor 1964 may also generate reference symbols for a reference signal (e.g., for the sounding reference signal (SRS)). The symbols from the transmit processor 1964 may be precoded by a TX MIMO processor 1966 if applicable, further processed by the demodulators in transceivers 1954a-1954r (e.g., for SC-FDM, etc.), and transmitted to the BS 110a. At the BS 110a, the uplink signals from the UE 120a may be received by the antennas 1934, processed by the modulators 1932, detected by a MIMO detector 1936 if applicable, and further processed by a receive processor 1938 to obtain decoded data and control information sent by the UE 120a. The receive processor 1938 may provide the decoded data to a data sink 1939 and the decoded control information to the controller/processor 1940.

The memories 1942 and 1982 may store data and program codes for BS 110a and UE 120a, respectively. A scheduler 1944 may schedule UEs for data transmission on the downlink and/or uplink.

The controller/processor 1980 and/or other processors and modules at the UE 120a may perform or direct the execution of processes for the techniques described herein. For example, as shown in FIG. 19, the controller/processor 1940 of the BS 110a has an cross-carrier manager 112 that may be configured for cross-carrier repetition, according to aspects described herein. As shown in FIG. 19, the controller/processor 1980 of the UE 120a has a cross-carrier manager 122 that may be configured for cross-carrier repetition, according to aspects described herein. Although shown at the Controller/Processor, other components of the UE 120a and BS 110a may be used performing the operations described herein.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication, comprising:
monitoring for an initial transmission of data from a network on a first entity;
receiving via separate control messages control information indicating second entities for receiving retransmission repetitions of the data, wherein one or more of the second entities are different than the first entity, and wherein each of the separate control messages is received prior to a respective one of the retransmission repetitions and indicates the second entities for receiving the retransmission repetitions; and
receiving the retransmission repetitions of the data via the second entities.

2. The method of claim 1, wherein the retransmission repetitions of the data comprises a first retransmission repetition of the data and a second retransmission repetition of the data, the method further comprising:
decoding the first retransmission repetition by combining the first retransmission repetition of the data and the initial transmission of the data;
generating a first A/N message indicating whether the decoding of the first retransmission repetition of the data was successful;
decoding the second retransmission repetition by combining the first retransmission repetition of the data, the second retransmission repetition of the data, and the initial transmission of the data;
generating a second A/N message indicating whether the decoding of the second retransmission repetition of the data was successful; and
transmitting the first A/N message and the second A/N message to the network.

3. The method of claim 2, wherein the first A/N message is carried in a first A/N codebook and bit locations of the first A/N message in the first A/N codebook correspond to a third entity of the second entities, wherein the third entity is associated with the first retransmission repetition, wherein the second A/N message is carried in a second A/N codebook and bit locations of the second A/N message in the second A/N codebook correspond to a fourth entity of the second entities, and wherein the fourth entity is associated with the second retransmission repetition.

4. The method of claim 3, wherein the first and second A/N messages are carried by different uplink (UL) A/N feedback resources, and wherein each of the different UL A/N feedback resources is configured for each of the first entity and the second entities for receiving each of the retransmission repetitions.

5. The method of claim 3, wherein the first and second A/N messages are carried by the same uplink (UL) A/N feedback resources, wherein the same UL A/N feedback resources is configured for one or more of the first entity and the second entities for receiving retransmission repetitions.

6. The method of claim 1, wherein the retransmission repetitions of the data comprises a first retransmission repetition of the data and a second retransmission repetition of the data, the method further comprising:
  decoding the retransmission repetitions by combining the first retransmission repetition of the data, the second retransmission repetition of the data, and the initial transmission of the data;
  generating an A/N message indicating whether the decoding of the retransmission repetitions of the data was successful; and
  transmitting the A/N message to the network.

7. The method of claim 6, wherein the A/N message is carried in an A/N codebook, and bit locations of the A/N message in the A/N codebook is determined based on one of the second entities for the retransmission repetitions of the data.

8. The method of claim 7, wherein the A/N message is carried by different UL A/N feedback resources, and wherein each of the different UL A/N feedback resources is configured for each of the first entity and the second entities for receiving each of the retransmission repetitions.

9. The method of claim 7, wherein the A/N message is carried by the same UL A/N feedback resource, and wherein the same UL A/N feedback resource is configured for one or more of the first entity and the second entities for receiving retransmission repetitions.

10. A method for wireless communication, comprising:
  transmitting an initial transmission of data to a user-equipment (UE) on a first entity;
  transmitting via separate control messages control information indicating second entities for receiving retransmission repetitions of the data, wherein one or more of the second entities are different than the first entity, and wherein each of the separate control messages is transmitted prior to a respective one of the retransmission repetitions and indicates the second entities for receiving the retransmission repetitions; and
  transmitting the retransmission repetitions of the data via the second entities.

11. The method of claim 10, wherein the retransmission repetitions of the data comprises a first retransmission repetition of the data and a second retransmission repetition of the data, the method further comprising:
  receiving a first acknowledgment/negative acknowledgement (A/N) message indicating whether decoding of the first retransmission repetition of the data was successful; and
  receiving a second A/N message indicating whether decoding of the second retransmission repetition of the data was successful.

12. The method of claim 11, wherein the first A/N message is carried in a first A/N codebook and bit locations of the first A/N message in the first A/N codebook correspond to a third entity of the second entities, wherein the third entity is associated with the first retransmission repetition, wherein the second A/N message is carried in a second A/N codebook and bit locations of the second A/N message in the second A/N codebook correspond to a fourth entity of the second entities, and wherein the fourth entity is associated with the second retransmission repetition.

13. The method of claim 12, wherein the first and second A/N messages are carried by different uplink (UL) A/N feedback resources, wherein each of the different UL A/N feedback resources is configured for each of the first entity and the second entities for transmitting each of the retransmission repetitions.

14. The method of claim 12, wherein the first and second A/N messages are carried by the same uplink (UL) A/N feedback resources, wherein the same UL A/N feedback resources is configured for one or more of the first entity and the second entities entity for transmitting retransmission repetitions.

15. The method of claim 10, wherein the retransmission repetitions of the data comprises a first retransmission repetition of the data and a second retransmission repetition of the data, the method further comprising:
  receiving an A/N message indicating whether decoding of the retransmission repetitions of the data was successful.

16. The method of claim 15, wherein the A/N message is carried in an A/N codebook, and bit locations of the A/N message in the A/N codebook is determined based on one of the second entities for the first retransmission repetition of the data and the second retransmission repetition of the data.

17. The method of claim 16, wherein the control information indicates the one of the second entities based on which resources for transmission of the A/N message is determined.

18. A method for wireless communication, comprising:
  transmitting an initial transmission of data to a network on a first entity;
  receiving via separate control messages control information indicating second entities for transmitting retransmission repetitions of the data, wherein one or more of the second entities are different than the first entity, and wherein each of the separate control messages is received prior to a respective one of the retransmission repetitions and indicates the second entities for receiving the retransmission repetitions; and
  transmitting the retransmission repetitions of the data via the second entities in accordance with the control information.

19. A method for wireless communication, comprising:
  receiving an initial transmission of data from a user-equipment (UE) on a first entity;
  transmitting via separate control messages control information indicating second entities for transmitting retransmission repetitions of the data, wherein one or more of the second entities are different than the first entity, and wherein each of the separate control messages is transmitted prior to a respective one of the retransmission repetitions and indicates the second entities for receiving the retransmission repetitions; and
  receiving the retransmission repetitions of the data via the second entities.

20. The method of claim 19, wherein the initial transmission of the data is received during a transmission occasion, and wherein the retransmission repetitions of the data are received during a retransmission time window if the data is not successfully decoded during the transmission occasion.

* * * * *